(12) United States Patent
Fabbio et al.

(10) Patent No.: US 7,456,832 B1
(45) Date of Patent: *Nov. 25, 2008

(54) OBJECT DATABASE-DRIVEN INTERACTIVE SHELL FOR A DATA PROCESSING SYSTEM

(75) Inventors: Robert Anthony Fabbio, Austin, TX (US); Anne Gregory Leonard, Austin, TX (US); Conrad William Schneiker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 07/352,530

(22) Filed: May 15, 1989

(51) Int. Cl.
G06T 11/20 (2006.01)
G06F 17/30 (2006.01)
(52) U.S. Cl. .......................... 345/440; 707/1
(58) Field of Classification Search ......... 364/518–522, 364/200, 900, 513; 340/706–717, 721, 747; 345/440; 710/1; 707/1
See application file for complete search history.

(56) References Cited

U.S. PATENT DOCUMENTS 4,885,717 A * 12/1989 Beck et al. ............... 364/900 M
4,899,136 A    2/1990 Beard et al.
5,502,839 A *  3/1996 Kolnick .......................... 710/1

FOREIGN PATENT DOCUMENTS

EP    0243671    11/1987
EP    0264199    4/1988

OTHER PUBLICATIONS

D. C. Robinson & M. S. Sloman, Domains: A New Approach to Distributed Dynamic Management, copyright IEEE, 1988.
H. J. M. Decuypere, "Object Oriented System Supporting Dynamic, Configuration", 1986.
1986 International Workshop on Object-Oriented Database Systems, Sep. 1986.
"Standardized Administration Tools for UNIX Machines," Commission of the European Communities, Sep. 11, 1988.
G. S. Preckshot et al, "Menu-driven menu editor and associated menu system", Review of Scientific Instruments, vol. 59, No. 8, Aug. 1988, pp. 1777-1779.

* cited by examiner

*Primary Examiner*—Jeffery A. Brier
(74) *Attorney, Agent, or Firm*—Duke W. Yee; Matthew W. Baca; Wayne P. Bailey

(57) ABSTRACT

This invention provides a tool for presenting items for selection by a user of a data processing system and for executing the selected items. Each item of the menus and dialogues is an individual and independent object in an object database, referred to as an interface object. These objects can be added or deleted independent of each other, allowing greater extendability and customization of the interface. The data within each of the interface objects and the selections from a user determine which of the interface objects will make up any one of several logical frame presentations at any one time to be presented to a user. The interface tool of this invention is adaptable for use with any one of a plurality of graphic libraries for presenting the actual screen image of the logical frame presentation to the user. In addition, the interface tool utilizes the message facilities of the system to present the elements of the interface in multiple languages. More specifically, the interface tool of this invention is used for managing the system resources of a data processing system by a user.

28 Claims, 18 Drawing Sheets

SMIT MENU OBJECT CLASS (sm_menu_opt) ⌒200

Each item on a menu in the SMIT tree corresponds to a menu object. The "menu" appearing on the screen is a set of these objects.

```
struct sm_menu_opt {
202 — *id;              /* symbolic key for object                       */
203 — *id_seq_num;      /* seq # for recs in this set                    */
204 — *next_id;         /* symbolic key for next object                  */
205 — *text;            /* describes task                                */
206 — *text_msg_file;   /* Message Facilities catalogue name             */
207 — text_msg_set;     /* Message Facilities set id for name            */
208 — text_msg_id;      /* Message Facilities message id for name        */
209 — next_type;        /* type of next action if this item picked       */
210 — alias;            /* is/is not fast path ptr to another screen     */
211 — help_msg_id       /* help system id/key for help text              */
};
```

Copyright IBM Corporation 1989

FIG. 2

SMIT DIALOGUE OBJECT CLASS (sm_cmd_opt) ⎰─300

Each dialogue (leaf) in the SMIT tree has an array of one or more options. Each option corresponds to a fields (parameter, option, or attributes) of the command that the dialogue performs.

```
     struct sm_cmd_opt {
302 — *id;                    /* symbolic key for object                   */
303 — *id_seq_num;            /* seq # for objects in this set             */
304 — *disc_field_name;       /* output hdr from cmd_to_discover           */
305 — *name;                  /* field name                                */
306 — *name_msg_file;         /* Message Facilities catalogue for name     */
307 — name_msg_set;           /* Message Facilities set id for name        */
308 — name_msg_id;            /* Message Facilities message id for name    */
309 — op_type;                /* method used to manage this field          */
321 — entry_type;             /* type of entry allowed in this field       */
322 — entry_size;             /* width of entry allowed in this field      */
310 — required;               /* is/is not rqd. for each exec of cmd       */
311 — *prefix;                /* AIX cmd flag for this option              */
313 — cmd_to_list_mode;       /* amount of listed item to use              */
312 — *cmd_to_list;           /* AIX cmd string for list of candidates     */
323 — cmd_to_list_postfix;    /* where to get cmd postfix, if any          */
324 — multi_select;           /* multiple select from list is/is not valid */
314 — value_index;            /* zero-origin index of value string, if ring*/
315 — *disp_values;           /* current, default or allowed values        */
316 — *values_msg_file;       /* Message Facilities catalogue for values   */
317 — values_msg_set;         /* Message Facilities set id for values      */
318 — values_msg_id;          /* Message Facilities message id for values  */
319 — *aix_values;            /* current, default or allowed values        */
320 — help_msg_id;            /* help system id for help text              */
325 — *cmd_to_validate        /* AIX cmd string for validation             */
     };
```

Copyright IBM Corporation 1989

FIG. 3

SMIT DIALOGUE HEADER OBJECT CLASS (sm_cmd_hdr)

There is a header for each dialogue in the SMIT tree.

```
struct sm_cmd_hdr {
402  *id;                       /* symbolic for object                        */
403  *option_id;                /* pointer to dialogue object                 */
405  *has_name_select;          /* is/is not preceded by a name selector*     */
404  *name;                     /* descriptive command name (task)            */
406  *name_msg_file;            /* Message Facilities catalogue file          */
407   name_msg_set;             /* Message Facilities set id for name field   */
410   name_msg_id;              /* Message Facilities id for name field       */
408  *cmd_to_exec;              /* AIX command string to execute              */
409   ask;                      /* assure that user wants to execute cmd      */
413   exec_mode;                /* command execution mode                     */
411   ghost;                    /* display or go straight to command          */
412  *cmd_to_discover;          /* cmd to fill in default/current values      */
414   cmd_to_discover_postfix;  /* where to get cmd postfix, if any           */
415   name_size;                /* size of name field; default used if = 0    */
416   value_size;               /* size of value field; default used if = 0   */
417   help_msg_id;              /* help system id/key for help text           */
};
```

Copyright IBM Corporation 1989

FIG. 4

SMIT NAME SELECT HEADER OBJECT CLASS
(sm_name_hdr)

A name select header object may, if needed, be created for each dialogue that appears as the terminal node (leaf) in the SMIT application. This header points to one sm_cmd_opt object which is used to solicit an instance of the object upon which the subsequent dialogue will act. (See above for specification of that object.)

```
       struct sm_name_hdr {
602 ─── *id;                 /* symbolic key for object                   */
603 ─── *next_id;            /* symbolic key for next cmd hdr object      */
605 ─── *option_id;          /* symbolic key for name selector cmd opt    */
604 ─── *name;                                                            */
606 ─── *name_msg_file;      /* Message Facilities catalogue name         */
607 ─── name_msg_set;        /* Message Facilities set id for name        */
608 ─── name_msg_id;         /* Message Facilities message id for name    */
609 ─── type;                /* method to process name selected           */
610 ─── ghost;               /* display or go straight to listing         */
614 ─── *cmd_to_classify;    /* AIX cmd to classify name                  */
611 ─── help_msg_id;         /* help system id/key for help text
       };
```

Copyright IBM Corporation 1989

FIG. 6

| ID | ID SEQ. | NEXT ID | TEXT | TEXT MSG FILE | TEXT MSG SET | TEXT MSG ID | NEXT TYPE | ALIAS | HELP MSG ID |
|---|---|---|---|---|---|---|---|---|---|
| top menu _202_ | 2 | _dev _204_ | DE-VICES _205_ | /etc /obj-repos /smit | smdev | nnn-nnn | menu _209_ | no | nnnn-nnn |
| _dev _202_ | 1 | _print | PRINT-ERS | /etc /obj-repos /smit | smdev | nnn-nnn | menu _209_ | no | nnnn-nnn |
| _dev _202_ | 5 | _term | HIGH FUNC-TION TERMI-NAL | /etc /obj-repos /smit | smdev | nnn-nnn | menu _209_ | no | nnnn-nnn |
| _term _202_ | 1 | _keyb | KEY-BOARD | /etc /obj-repos /smit | smdev | nnn-nnn | menu _209_ | no | nnnn-nnn |
| _keyb | 1 | _swk-bd | SWITCH MAP-PING | /etc | smdev | nnn-nnn | dia-log | no | nnnn-nnn |

701, 702, 703, 704, 705

| ID | NEXT ID | NAME | NAME MSG FILE | NAME MSG SET | NAME MSG ID | TYPE | GHOST | NAME SIZE | VAL-UE SIZE | CMD TO LIST MODE | CMD TO LIST NAMES |
|---|---|---|---|---|---|---|---|---|---|---|---|
| _swk-bd | _swk-bda | Name of Key-board | /etc /obj-repos /smit | hft-dd | nnn-nn | SM_JUST_NAME | yes | 0 | 0 | first field | ls-kbd |

706

| CMD TO CLASSIFY | HELP MSG ID |
|---|---|
|  | nnnnn |

FIG. 7

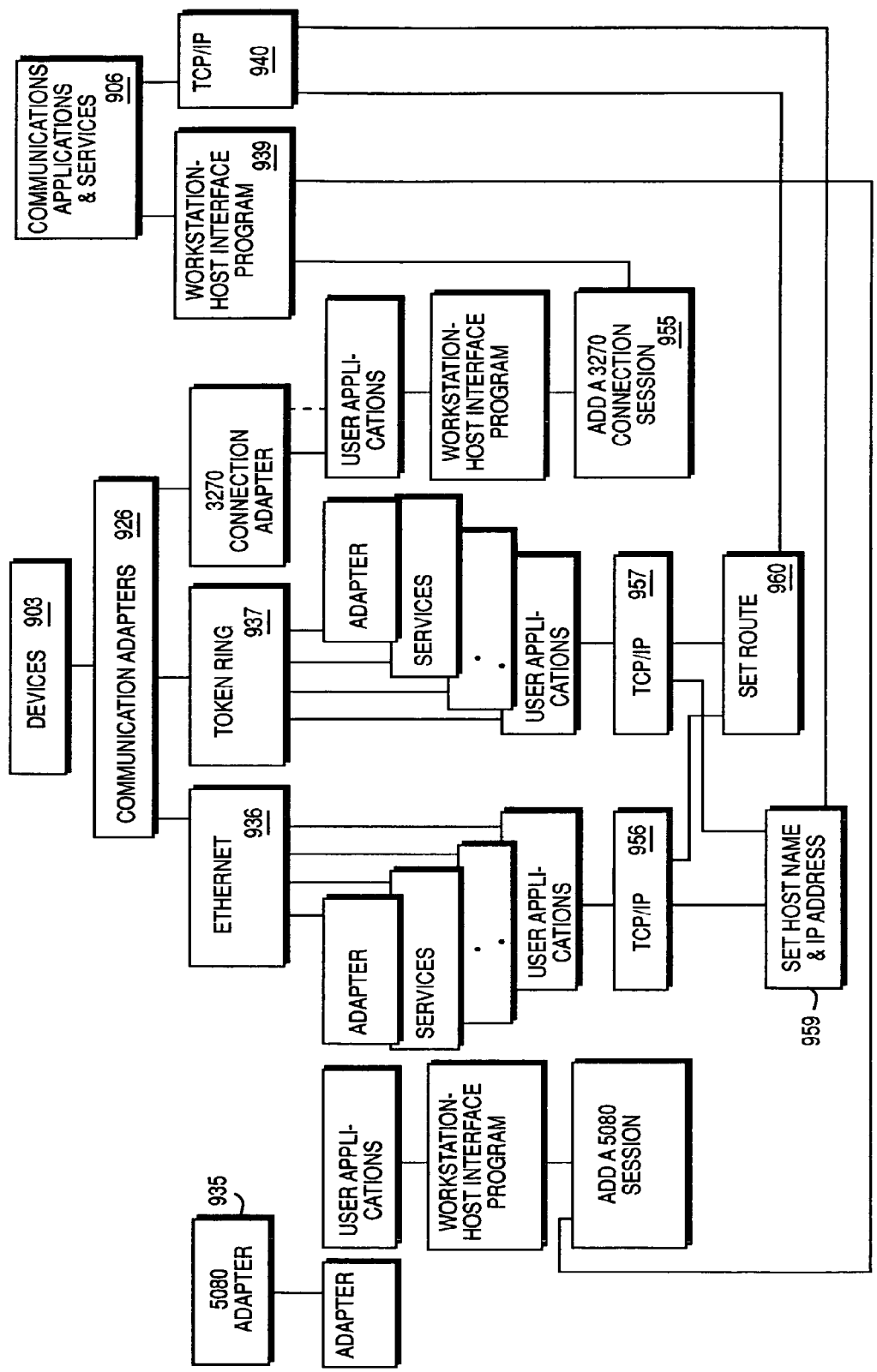

OBJECT DATABASE-DRIVEN INTERACTIVE SHELL FOR A DATA PROCESSING SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

Application Ser. No. 07/352,074 filed May 15, 1989 in the name of R. J. Archon, now abandoned, hereby incorporated by reference.

Application Ser. No. 07/352,571 filed May 15, 1989 in the name of R. A. Fabbio, now abandoned, hereby incorporated by reference.

Application Ser. No. 07/352,081 filed May 15, 1989 in the name of R. A. Fabbio, now abandoned, hereby incorporated by reference.

BACKGROUND OF THE INVENTION

1. Field of the Invention

This invention relates to implementing a user interface for a data processing system, and more particularly to representing all elements of the interface as objects in an object database.

2. Description of the Related Art

The term system management refers to the facilities or tools used to manage the configurable domains that a user is exposed to in a data processing system environment. A domain may be those devices, users, distributed file system, subsystems, and networks in a system; where the system may extend beyond a single machine. The system management facilities for each of the configurable domains may include the means to configure the system components when components are added or deleted from a system, means to configure a data processing system within a network of other data processing systems, and/or means to diagnose failures in the system components or the system configuration, etc. Traditionally, system management is treated as an ancillary element of an operating system environment; made up of an assortment of disjoint tools which collectively offer the administrator/user the ability to manage and monitor various aspects of the system.

In order for a user to perform tasks within a data processing system, there must be an interaction between the user and the data processing system. Instead of requiring the user to enter the data required by the processing system in the language that the processing system understands, user interfaces are created so that the user can enter data into the data processing system and receive information back in a language and facility that is easy for the user to understand and manipulate. These user interfaces are quite numerous and varied.

Some dialogue managers are based on tag languages. Tag languages require a developer who is creating a screen to know a specific non-programming language. The tag language specifies the screen layout on a total screen by screen basis. Specifying the screen layout includes specifying strings that are to appear on the screen, specifying the allowed values for the fields within the screen, and specifying the actions to be taken by a user. In addition, the tag language for one complete screen also specifies the next total screen that is to appear subsequently.

One user interface, used for performing system management tasks, groups system management tools based on their function, and presents to the user a hierarchy of menus, solicits inputs for required parameters, and executes the functions. This interface uses a database of tables to store information about menus and options. However, since many of the same options appear in many of the same menus, the database is required to maintain all of the possible permutations between the menus and options. Excessive storage requirements within this database are necessitated since data on each option and menu are stored repetitively throughout the database. Therefore, if a change to one of the options or menus were made, the database can not be updated just once, but must be updated at all of the locations where instances of that data resides. No one table within the database is sufficient to define any single interface object or group of objects, such as a menu or options within that menu.

In addition, there is no ability to discover or develop the system information during the execution of the interface tool. Therefore all system resource attribute values presented to the user must be initialized at development time, and can not reflect the true state of the system at the time of execution of the interface tool. Therefore, the validation of user input for parameter values must be checked against these values initialized at development instead of being checked against the values that are actually valid based on the runtime configuration of the system resource. Similarly, messages displayed in this interface tool are initialized in the database tables rather than arising from the workings of the system itself.

Generally, to update or change the interface database, it must be locked until changes are complete. This means that the database can not be modified until the end of the interface tool session. Any modifications made to the database through the interface tool are not immediately reflected in the interface tool until the next session of the interface tool. In addition, only system administrators typically are allowed to modify the database.

Users generally are required to enter the hierarchy of the interface tool at a specified point. This requires that a user be presented a sequence of preliminary menus before the menu pertinent to the users task is presented.

Typically, these known interfaces are bound to one graphic representation. This decreases the interface's portability to other systems having other graphic libraries. In addition, the interface database must be rewritten or another database completely redeveloped if the menus, options, messages, etc., are to support screen presentations in multiple languages.

Also, in some interface tools, the actions to be performed in order to operate the tool are mixed together with the jobs to be performed by the functional layer in menus. For example, the functions "exit", "go to next screen", "go to previous screen", are contained within the menus and not the interface tool. As a result, if an administrator adds new menus, these functions must be included. Otherwise, if they are excluded, the user has no means for escaping from the interface tool.

SUMMARY OF THE INVENTION

It is therefore an object of this invention to represent the user interface in an object database.

It is therefore a further object of this invention to represent each element of a screen as an object in an object database.

It is therefore a further object of this invention to create menus dynamically during the execution of the interface tool from self identifying independent interface data objects.

It is therefore a further object of this invention to create screen presentations of an arbitrary number of elements.

It is therefore a further object of this invention to minimize the space needed for the storage of the interface database by building screens from reusable interface data objects.

It is therefore an object of this invention to create an interface tool that interacts dynamically with the system to present to the user a current state of the system instead of preinitialized information of the system.

It is therefore a further object of this invention to allow interactive changes to the interface database during the execution of the interface tool which are reflected during this same session of execution.

It is therefore a further object of this to allow all users of the system to create new interface objects, and to modify existing objects based upon their access permission to them.

It is therefore a further object of this invention to provide different administrative views by utilizing the access control policies which apply to the interface objects.

It is therefore a further object of this invention to allow a fast path into the hierarchy to obviate traversal of the entire hierarchy.

It is therefore a further object of this invention to support independent multiple graphical libraries.

It is therefore a further object of this invention to utilize the message facilities of the system to present the elements of the interface in multiple languages.

The system and method of this invention is an interface tool for displaying menus and dialogues to a user. The actual visual presentation to the user is performed by any screen library using the data from this interface tool. The interface tool is used in a preferred embodiment as the interface between a user and system management functions. The interface tool of this invention is a generic engine that has no knowledge of the individual instances of system management that it presents. The navigation through and presentation and collection of data are all directed toward the goal of calling an appropriate function in the application or system layer. This work can be done without special case knowledge because the interface tool is driven by self-defining, independent data objects which are sufficient to give direction to the interface layer for the accomplishment of the above tasks.

The menus, dialogues, and each instance of a system resource are represented as objects within an object database, and are referred to as interface objects. Data within these interface objects reflect the topology of the system resources. The interface tool traverses these interface objects based upon the data within the interface objects themselves and the user selections.

A distinction is made between interface data objects and system resource data objects, otherwise referred to as application data objects. System resource objects are described in more detail with reference to Ser. No. 07/352,074, filed May 15, 1989 in the name of R. J. Archon, now abandoned, hereby incorporated by reference; and Ser. No. 07/352,571, filed May 15, 1989, in the name of R. A. Fabbio, now abandoned, hereby incorporated by reference. System resource data objects define the workings of the system, are installed with the software (application or system) that control them, are read/write to the application layer, and are of no direct interest to the interface tool.

The interface data objects define the workings of the interface, are installed with the software (applications) that they control, are primarily read-only to the interface tool, and are independent of other layers within the data processing-system. The interface tool gets information that it needs, which is contained in the system resource data objects, via calls to functions in the application layer rather than by direct reference to this body of data.

The interface tool can independently execute any command, controlling all input and output. It therefore has access to, and control of, all system resources by execution of the appropriate command shell functions.

Although a distinction exists in the above-mentioned groups of data, it is not technically necessary for the various groups to reside in different databases or to use different database referencing techniques. The lines between the groups are maintained without extra effort because the interface layer is designed to reference only those object classes about which it knows (see below for class definitions). There is no possibility of the interface tool being instructed to reference system data (or vice-versa), because such data is kept in not only different data objects, but in different classes of data objects, about which the interface tool knows nothing. However, the method for referencing any class of data object will be the same.

An object-oriented interface model allows for highly flexible, easily extendible interfaces. Pieces of the interface can be added or subtracted with minimum impact to the layer as a whole. With the addition of each new piece of software, interface objects can be added to the data repository, allowing newly installed parts of the system to be managed in exactly the same way as parts that were the first to be designed. Hence, there is no need for third party vendors to negotiate with the original manufacturer to get the support they need for their application. The problem of maintenance is diminished because the user who is extending or tailoring her/his interface does not edit large amounts of data (tables, programs, etc.), but rather creates new interface objects and adds them to the ones already in the repository. Without the need of re-compilation, the new objects appear in the desired environment the next time that the environment is entered because they will share a common id key with the other objects in that environment and therefore be found by the interface tool.

BRIEF DESCRIPTION OF THE DRAWING

FIG. 2 shows the structure of an interface menu option object.

FIG. 3 shows the structure of an interface dialogue command option object.

FIG. 4 shows the structure of an interface dialogue header object.

FIG. 6 shows the structure of an interface name select object.

FIG. 7 illustrates the dynamic traversal through the interface objects.

FIG. 10C is a further exploded view of the hierarchy shown in FIG. 10A and FIG. 10B.

DESCRIPTION OF THE PREFERRED EMBODIMENT

Figure 1A:
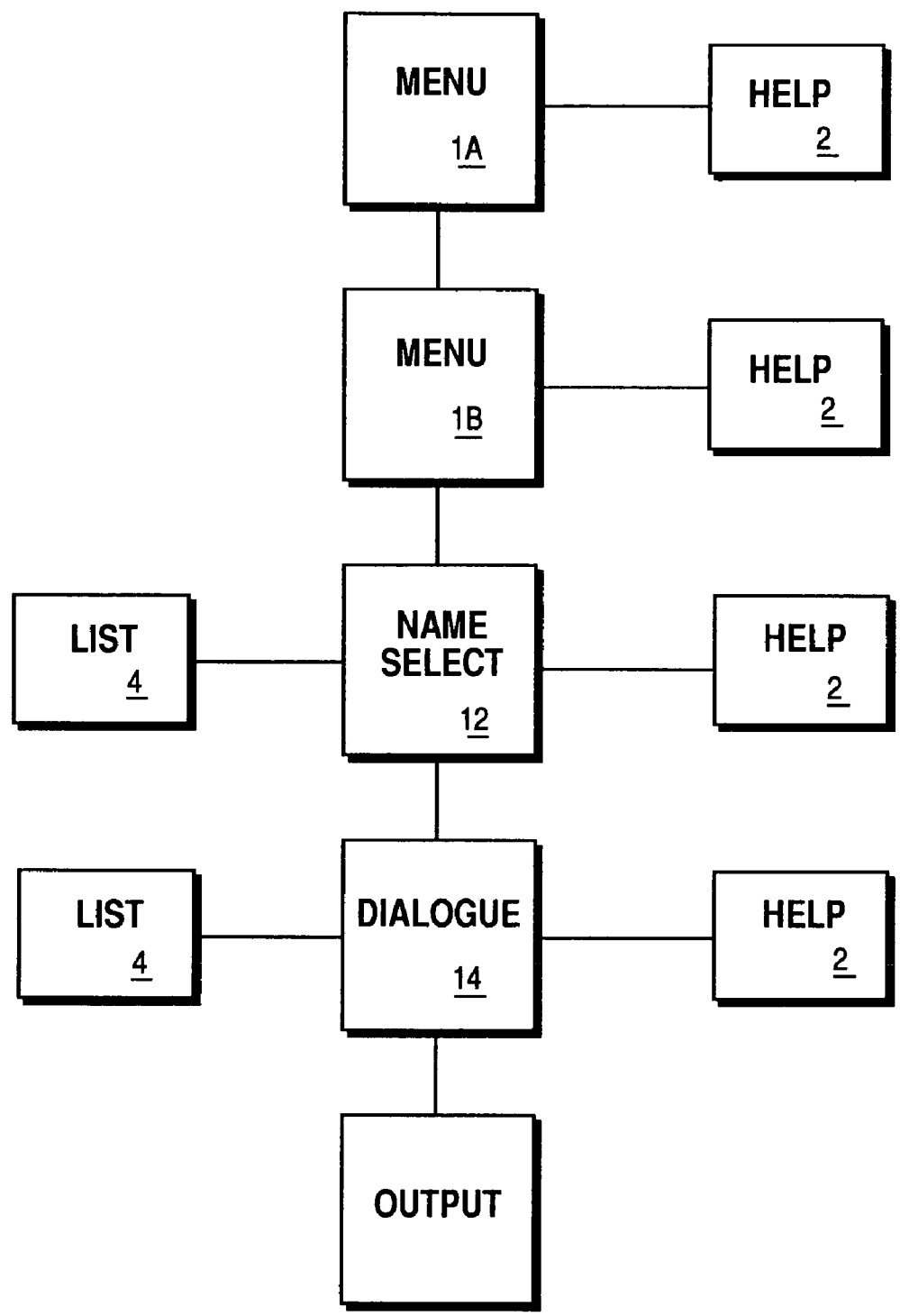
FIG. 1A shows the progress of work from a top menu to the execution of a job from a dialogue.

There are three general types of objects in the interface database: menu, name card (i.e., name select), and dialogue. They are differentiated by the role each plays in the collection of information, but do not necessarily differ in presentation. In brief, the menu allows the user to refine and define the job that is required. The name card allows the user to specify a specific instance of a resources class either to which the user wishes to apply changes or with which the user wants to work/plan/model, etc. The dialogue allows the user to specify detailed information about instances of resources. The interface tool of this invention may use combinations of these three types in order to collect all the required information before executing the application layer functions. For certain paths, one or more of these types may be unnecessary. The data objects themselves tell the interface tool code which objects come next in the path to the desire end function.

The three classes of data objects in the interface tool are functional classes, and are not meant to have any set, specific correlation to presentation types or methods. In addition, a data object class may be present to interface tool but have no displayed correlation to the user.

The term, "menu" is not meant to connote any particular screen appearance, or even to suggest that items are presented in a list of any form. "Menu" will be used to signify a means of diminishing the scope of either the object or the action (the noun or the verb) which is managed.

The user is in a menu as long as the user is further refining the management job. The menu could take the form of a choice from a list, objects that may be opened for further detail, zooming in our out, movement through rooms, or whatever metaphor is appropriate. Once the job has been sufficiently defined, then the user leaves the realm of the menu for the dialogue. Note that the purpose of a menu is to get to a dialogue.

Menus do not execute the end job, but merely carry the user through to the job. Some functions do get executed, however, during passage through menus. These functions can be thought of as facilitating or lateral functions. They may be used to validate choices, present possible candidates for selection, and give help to the user. In general, then, these lateral functions do cross over to the application layer to execute specified functions. However, these crosses are made to gather information for the user during the progression to the main job. As such, these facilitating functions are generally "read only" function. Passage through menus does not result in change to the application or system database.

A menu is not a pre-defined entity, but rather a snapshot of all independent end user data objects that are found in the database at the time that the user enters the environment of one particular menu. The subset that is "found" at any one time is the set that meets a search criteria by means of a key field. This is an essential requirement for third-party extendibility of the interface. End user data objects may be easily added or deleted from the database without undue effect on other objects.

Menu interface data objects are arranged into a hierarchy which is similar but necessarily equal to the heirarchy of system resource data objects. The hierarchy of menu tasks represents the most convenient and usuable view of the system resources to the user.

Figure 10A:
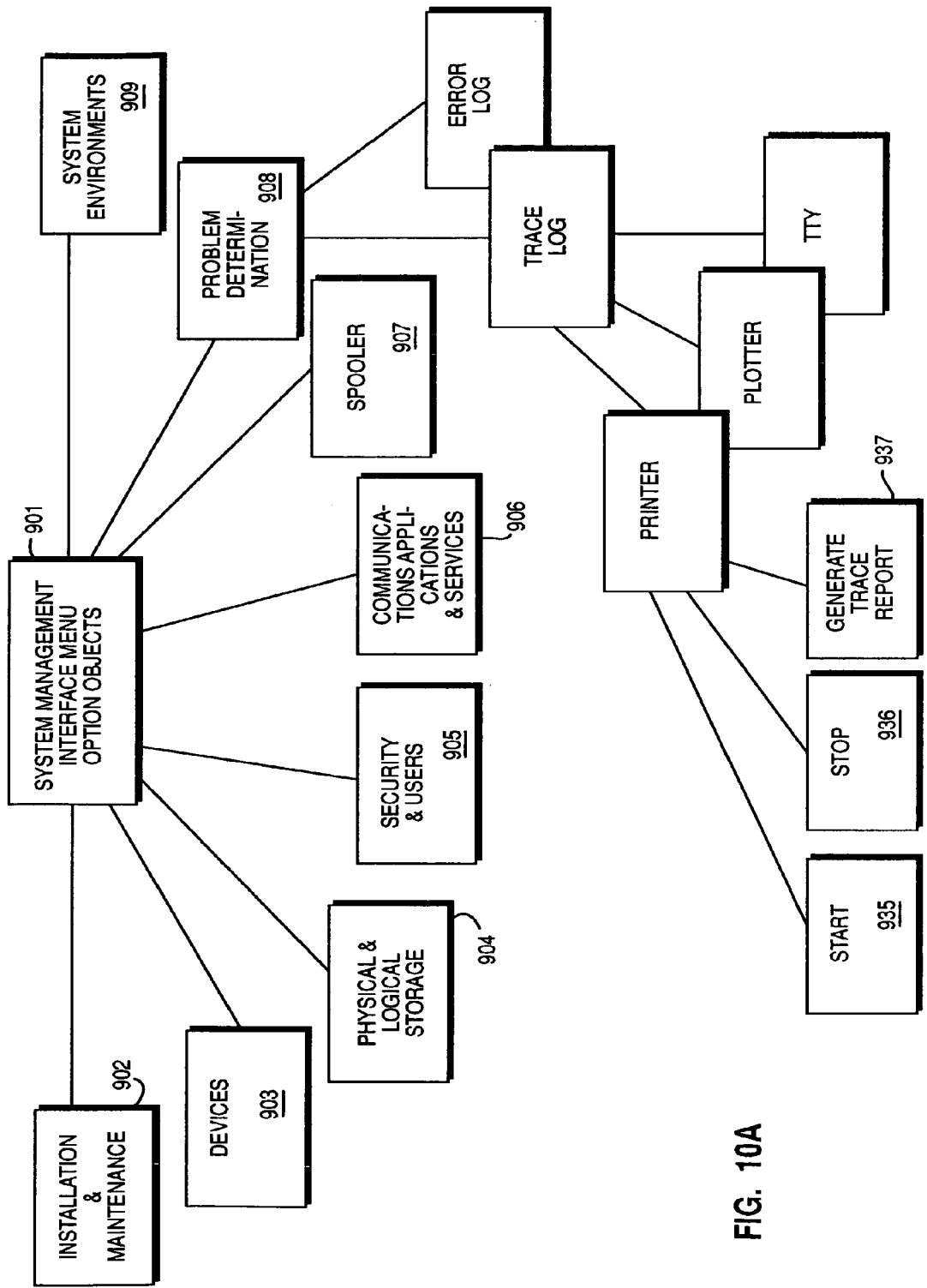
FIG. 10A illustrates the hierarchy of system management menu option interface objects.
Figure 10B:
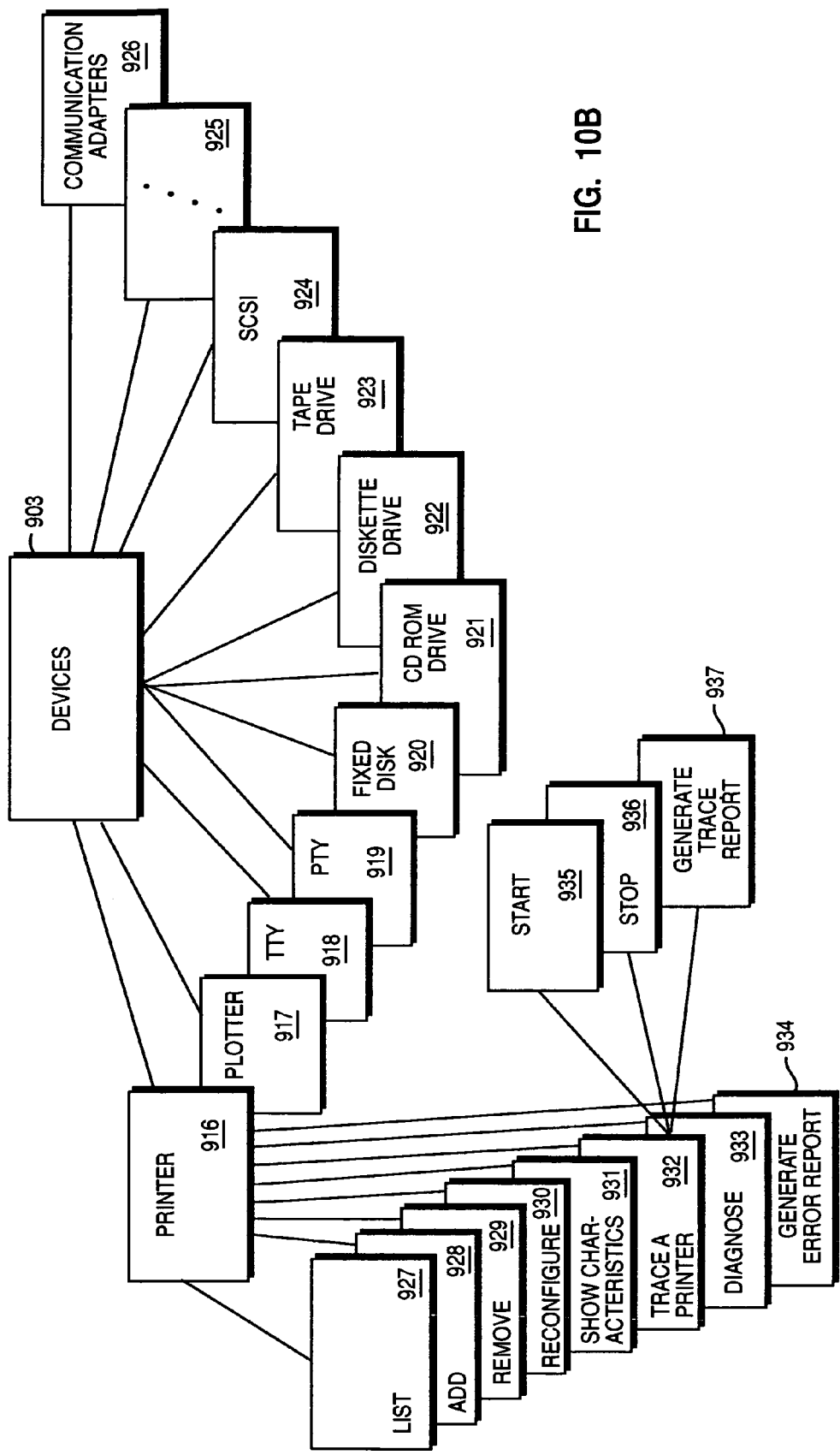
FIG. 10B illustrates the hierarchy of devices menu option objects within the hierarchy of the system management interface objects.

FIGS. 10A, 10B, and 10C illustrates a portion of the hierarchy which exhibits the salient characteristics of the interface tool hierarchy. The menu objects 901-909, FIG. 10A, appear together in a logical frame presentation by virtue of sharing the same search key. FIG. 10B illustrates the branch of the hierarchy that would be available for the traversal if data object 903, FIG. 10A, were selected by the user. Menu interface data objects 916-926, FIG. 10B appear together in a logical frame presentation by virtue of sharing the same search key. Objects 927-934 would appear together in a logical frame 30 presentation if object 916 were selected. If object 932 were selected, objects 935-937 would be available for selection. These are the same objects that appear on FIG. 10A in a logical frame presentation which is reached through a different selection path through the 35 hierarchy. FIG. 10C shows a continuation of the branch available through selection of menu object 926, FIG. 10B. Objects 936 and 937, FIG. 10C, lead to different branches of menus. However, because TCP/IP is available to the user for configuration on either adapter 956, 957, some menu objects 959, 960, FIG. 10C, are shared between the two branches. Menu object 906, FIG. 10A, is repeated on FIG. 10C. Its selection causes the presentation of object 939 and 940. The selection of menu object 939 results in a logical frame presentation which includes object 955 and 945. Object 955 is also contained in a logical frame presentation arrived at by the selection of object 954. Object 945 is also contained in a logical frame presentation arrived at by the selection.

The information contained in each menu object is sufficient to do the following: 1) present the menu item (the actual visual representation is left a screen library); 2) point to a subsequent (set of) object(s); and 3) give help on the menu item.

The menu object class 200 is shown in FIG. 2. The id 202 is the name of the object. This field holds information sufficient to provide a search key by means of which this object is pointed to by the previous level object, thereby determining this object's participation with other objects in a group. This field may be externalized as a fast path id.

The id_seq_num 203 indicates the order in which the objects of the menu will be displayed. The next_id 204 indicates the id of the next object for which to search if this item is selected. The field text 205 describes the task to be presented to the user. The text_msg_file 206 is the message facilities catalogue for the string, text. The text_msg_set field 207 is the message facilities set id for the string, text. Set ids are assigned by message services. The text_msg_id field 208 is the message facilities message id for the string, name. The next_type field 209 indicates the type of the next object if this item is selected. Allowed values are "menu", "name", "dialogue", and "info". The alias field 210 indicates whether or not this menu object is a fast path pointer to another menu object. Allowed values are "yes" and "no". For a menu object which is an alias, the following convention applies: the objects next_id 204 and id_seq_num 203 will be used to find the menu object which will point to the menu desired. The help_msg_id 211 indicates the tag number for the contextual help for the object.

A dialogue is a composite of elements (as represented individually in data objects) that are found to be related at any one time. Therefore, it may be thought of as an array of structures, each element of which corresponds to a piece of information (parameter) that will be passed to the function which is the end job of the dialogue. Although the elements may vary widely in their graphic representations, the information contained in them is structured in the same way and is sufficient to do the following: 1) present the dialogue item (proper representation is left to the graphical/text library); 2) point to a function to be executed; 3) present and collect choices (values); and 4) give help.

The dialogue element objects have both a "question" (id) and an "answer" (value) part. The answer part may have a tentative answer to suggest to the user, i.e. a default or current value. These two parts may have very different origins. It is necessary that the question be initialized when the dialogue object is developed. With it are initialized all of the other fields in the data object, with the (possible) exception of the answer. The answer may have no suggested value, or it may have a limited set of possible values. However, if the answer is dependent on the current state of the system, then it must be "discovered" at run time. The discovery process is detailed below.

The "question" mentioned above may be no more than implied by the very presence of the element in the dialogue. For example, if the metaphor of the dialogue called for a dial, the elements of the dial, namely the face and the needle, would each be elements in the dialogue. Upon entry into that environment, the use is not confronted with a literal question. The question, "what is the desired setting of the needle?" is implied by the existence of the needle. The answer (value) would be given a current (input) value, which is discovered as detailed below. The user manipulates the needle to the desired setting, and that setting now becomes the output value of the data object. The new setting is received as a parameter when the interface tool executes the proper function to accomplish the change.

To create a dialogue on the screen, the interface tool searches for keyed data objects (the key having been supplied from the previous object's "next" field), chooses appropriate representations for the data objects (according to the current metaphor and/or NLS environment), orders the data objects according to their self-stated relationships to other possible objects, and prepares to present them to the user. However, some aspects of the data objects (such as current values) may be missing. At this time, the interface tool invokes application layer functions to discover current configuration values. The names of these functions, as well, are contained within the dialogue data objects.

The dialogue is represented by two classes of data objects. The header object represents the end job and is sufficient in itself to effect the application function database, thereby effecting real changes in the system. For each header object, there are one or more element objects. Each element presents one item of the metaphor, one resource, one parameter, one choice, one value, etc.

While all menus lead to a dialogue header object (that really gets the work done), not all dialogue header objects lead to dialogue element objects. When the job is sufficiently defined ("diminished") by menus, there may be no need for further interaction with the user. In this case, the dialogue header will suffice, and the function will be dispatched without further ado. However, in other cases, more detailed information (choices) will need to be solicited from the user (or at least presented to the user for possible change).

The distinction between dialogues that contain headers only and those that contain elements, as well, can be either functional, stylistic, or contextual. For example, a request to list the instances of a resource is usually an end in itself, and would not need further elaboration via dialogue element data objects. The function to accomplish this could be immediately executed. (It, in turn, might send back these data elements to be located in the dialogue environment.) If the user desires, on the other hand, to change characteristics of a resource, e.g. an alert message, then there would be (at least) one dialogue element, the value of which is the current message. The user could change this as the user pleased and then the function contained in the header would cause the change to occur. Resources with multiple characteristics which can be changed would need a separate element data object for each one. All, however, are united under the single header. The distinction between the case in which the header is sufficient and the case in which it must be supported by multiple elements is a functional one. In cases where there is never a function need for elements, they would not be defined.

In contrast is the case in which one single function may require the further detailed elaboration of the element objects or it may not. If the user wishes to add a resource of a known type, the interface tool may use the context, style, or security level currently active to determine whether the user-definable characteristics of the resource are presented to the user for perusal or possible change at the time that the resource is added. At some levels, it might be considered inappropriate or annoying to present such details, while at other levels it would be essential. In cases where the distinction is not functional, the element objects should be defined and the decision left up to the interface tool.

The dialogue header object class 400 is shown in FIG. 4. The id 402 is the id or "name" of the object. The field option_id 403 is the id of the dialogue fields (sm_cmd_option) to which the header refers. The field has_name_select 405 indicates that the dialogue was or was not preceded by a name selector. Allowed values are "yes" and "no". The name 404 describes the job and is used as the title of the dialogue. The name_msg_file 406 is the message facilities catalogue for the string, name. The field name_msg_set 407 is the message facilities set id for the string, name. The field name_msg_id 410 is the message facilities id for the string, name. The field cmd_to_exec 408 is the operating system command which executes the job of the dialogue.

The field ask 409 indicates whether or not the user should be asked to reconsider the user's choice to execute a job (i.e. task). This is useful for such jobs as "DELETE", where a system resource is being deleted. Often, reconsideration is necessary even when there is no displayable dialogue associated with the job. If this is the case, a ghost dialogue is utilized. The field ghost 411 indicates whether or not there is a displayable dialogue associated with this job. If there is no further information that needs to be solicited from the user, there is probably no need for a dialogue. In this case, the cmd_to_exec 408 is immediately executed. Allowed values for the field ghost 411 are "yes" or "no". Allowed values for the field ask 409 are "yes" and "no".

The field exec_mode 413 indicates whether a command will be executed with stdin/stdout/stderr redirected through the interface tool (sm_default), or will inherit stdin/stdout/stderr for independent screen management (sm_fork_exec). The field cmd_to_discover 412 is the operating system command used to discover either the default or the current values of the object being manipulated. This command is executed before the dialogue is displayed, and its stdout is retrieved.

The headers of the output columns will be used to match values with fields. The field cmd_to discover_postfix 414 indicates the postfix to be used with the command_to_discover. There are three allowed values. The first is only used when there is a name selector associated with the dialogue. The value sm_postfix_raw indicates that the name entered into the name selector panel is to be used with this command. The value sm_postfix_cooked indicates that the name from the selector panel was typed by a cmd_to classify, and that the output from that classifying command should be used with the cmd_to_discover. The value sm_postfix_empty indicates that there is not postfix for the cmd_to discover.

The field name_size 415 indicates the width of the field names for the dialogues. If this field is 0, default formatting is utilized. The field value_size 416 indicates the width of the field values for the dialogue. If this field is 0, the default formatting will be used. The field help_msg_id 417 indicates the tag number for the contextual help for the entire dialogue.

The dialogue object class 300 is shown in FIG. 3. The field id 302 is the id or "name" of the object. All objects (fields) that are to appear together in one dialogue must have the same id. The id_seq_num 303 insures that the objects (fields) of the dialogue will be displayed in sequence. All character values are sequenced by code point. When this object is used for a name selector, this field is 0. The disc_field_name 304 indicates the header string in the stdout from the cmd_to_discover whose value is to be associated with this object. It is the logical equivalent of the name field 305, but may be a more abbreviated form. This field is to be coordinated with the stdout of the cmd_to_discover 412. To indicate that the value for this object is to come from the (raw/cooked) name instead of the cmd_to_discover, this field should be set to "rawname" or "cookedname". When this object is used for a name selector, this field is reserved and is set to null.

The name 305 field is the string which will appear on the screen as the field name. It is the "question" portion and usually correlates to a parameter of the cmd_to_exec, i.e., it is the natural language explanation of an option, parameter, flag, etc. The name_msg_file 306 is the message facilities catalogue for the string, name. The name_msg_set 307 is the message facilities set id for the string, name. The name_msg_id 308 is the message facilities message id for the string, name.

The op_type field 309 indicates the screen management method for this object. The allowed values are as follows. The value sm_list_entry indicates that, although 0 or 1 values are presented to the user, a list is available for this field. The list is produced by the cmd_to_list when the user indicates the LIST function. The value sm_ring_entry indicates that the field has multiple values through which the user may cycle. All ring fields may be also shown as lists (i.e. all choices at one time, within the limits of the screen).

The entry_type 321 indicates the screen management method for this object. The value sm_text_entry indicates that the user may type alphanumeric input into the field. The value sm_numeric_entry indicates that the user may enter only numeric data. The value sm_hex_entry indicates that the user may enter only hexadecimal data. The value sm_file_entry indicates that the user may enter only a file name. The value sm_no_entry indicates that the field is information only.

The field entry_size 322 indicates the maximum number of bytes that the user may enter into the value field. If this number is 0, then no upper limit is requested. The field required 310 indicates whether the field must always be sent with the cmd_to_exec, regardless of whether the user has changed the value. Ordinarily, an unchanged field field is not sent with the command. Allowed values are "yes" and "no". When this object is used for a name selector, this field is reserved, and is set to null.

The field prefix 311 indicates the prefix or flag that is to be sent with the value field in the execution of the cmd_to_exec. It may be set to null for no flag or "-f" where "f" indicates the flag to be used. In both of these cases, the value and the flag will be collected on the first pass. Also, it may be set to "--", which indicates that there is no flag and the value should be collected on the second pass. When this object is used as a name selector, this field is reserved and is set to null.

The cmd_to_list_mode 313 indicates how much of an item selected from a list should be used. Allowed values are sm_first_field and sm_all_fields. If the command returns a range rather than a list, the value of this field should be sm_range. Ranges are not selectable, but are for information only. The cmd_to_list 312 indicates the operating system command, if one exists, which supplies a list of candidates for the value field. The field cmd_to_list_postfix 323 indicates the postfix to be used with the cmd_to_list. There are three allowed values; the first may be used only when there is a name selector associated with the dialogue. The sm_postfix_raw indicates that the name entered into the name selector panel is to be used with the command. The value sm_postfix_cooked indicates the output from the name selector's cmd_to_classify should be used with the command. The value sm_postfix_empty indicates that there is no postfix for the command. When this object is used for a name selector, this field is reserved and should be set to null.

The field multi_select 324 indicates whether the user may make multiple selections from the cmd_to_list. Allowed values are "yes" and "no". The field value_index 314 is a zero-origin index indicating the default value in the sequence of values specified in the value field if the object is a ring.

The field disp_values 315 provides the current, default, or allowed values which are to be presented to the user at the beginning of a dialogue. This field may be initialized when the object is developed or discovered at runtime by the cmd_to_discover. The values_msg_file 316 is the message facilities catalogue for the string, disp_values, if these values are initialized when the object is developed. The values_msg_set field 317 is the message facilities set id for the string, disp_values, if these values are initialized at development time. The field values_msg_id 318 is the message facilities message id for the string, disp_values, if these values are initialized when the object is developed.

The field aix_value 319 indicates the operating system command values that are equivalent to the natural language disp_values presented in a ring field initialized at development time. When this object is used for a name selector, this field is reserved and should be set to null. The help_msg_id 320 indicates the tag number for the contextual help for the object. The field cmd_to_validate 325 is used to validate user input values for a single field.

Name selector objects are used for gathering the instance of an object upon which an application layer function is to be performed. In other words, they select the direct object of the function. The list function in the name card supplies the run-time choices from which the user may select.

Name selector objects supply parameters used in the execution of succeeding end or lateral functions. Name selector objects are also used to direct the interface layer to different succeeding interface data objects, thereby altering the path taken towards an end function.

For example, if the user wishes to connect a certain printer to a certain queue, the interface tool must know exactly which printer (not just which type) is to be connected. In other words, it needs a logical instance name. It solicits this information by a name selector object. The interface objects cannot be initialized with a list of possible printer names because this information depends on the current configuration of the system. Therefore, the name selector object defines the application layer function which will retrieve the list of printers of the desired type that are known to the system (i.e. represented in the system database). Name select objects carry out a list and select function. The name selected is needed as a parameter to the end job function.

At a higher level, name selector objects may be used to list types of physical printers rather than names of logical printers. Again, the interface objects cannot contain this list, but must contain the name of the function to execute in the application layer to get this information. When the user chooses between types in a resource class, the choice often has implication on the choice of subsequent data objects. Not all types of printers will operate (connect/configure, etc.) in the same way. Therefore, the type selected will be used in some way (perhaps concatenation) to find the next interface object(s).

In general, the function to list is automatically executed to present the user with only valid choices. On the other hand, if the list of choices is so long that the extensive scrolling of the presentation space in order to present the entire list would only annoy the user, or the list of candidates is almost limitless, or the user is likely to know the name of the object that the user wants to select, the shortest path is to represent the name select function to the user with the ability to simply key in the instance offering the listing feature as an option. This case will often occur in working with file systems where every file might need to be listed as a candidate.

The name select object class 600 is further described with reference to FIG. 6. The id 602 is the id or "name" of the object. The field next_id 603 indicates the id of the sm_cmd_hdr object which this name selector precedes. The field option_id 605 is the sm_cmd_opt for this name selector. The field name 604 is the title of the name selector screen. The field name_msg_file 606 is the message facilities catalogue for the string, name. The field name_msg_set 607 is the message facilities set id for the string, name. The field name_msg_id 608 is the message facilities message id for the string, name.

The field type 609 indicates the method to be used to process the name selected. The value sm_just_name indicates that the name selected is merely passed to the dialogue. In this case, the next_id field is a fully-defined string, initialized at the time the object is developed. The cmd_to_classify is not needed and is therefore null. There is no need to wait until an instance is selected to decide which dialogue need be presented. The value sm_raw_name indicates that the name selected is concatenated with the string in next_id to produce the search key for the dialogue. An example of this case is seen in a TCP/IP menu where the name selection "Ethernet" calls up a different dialogue than the name selection of "Token". In this case, the next_id is defined partially at development, and partially at runtime. Again, cmd_to classify is not needed and therefore null. The value sm_cooked_name indicates that the name selected is not sufficient for the determination of which dialogue next to present. An example of this is with printers, where the selection of an instance, "lp0", does not give enough information for the selection of the next dialogue because "lp0" is of unknown type. In this case, next_id gets the value of next_id+the stdout returned from the cmd_to classify, which is sent the name_selected.

The ghost field 610 indicates whether or not to display the name field 604 or go straight to listing produced by the cmd_to_list. The cmd_to_classify 614 indicates the operating system command, if one is needed, that is to be used to classify the value of the name field 604 of the sm_cmd opt record for this name selector. The field help_msg_id 611 indicates the tag number for the contextual help for the object.

FIG. 1A shows the progression of work, from a top menu 1A down to the execution of work. All work is executed out of a dialogue 14. Although the lateral help 2 and list 4 do not contribute to the progression, they do assist the user to make the progression by offering help and lists of possible candidates off of any item. A user enters at a top menu 1A and traverses through several other possible menus until the user gets to a name select 12, which is optional. Next is the dialogue 14. Each of these three steps: menu 1, name select 12 and dialogue 14 appear differently and have different properties. A dialogue is the actual interaction with a user, and it typically consists of attributes of the system resource. The user then enters or selects values for the attributes, completes all the responses for the dialogue, and then indicates that the user is ready to run the task which is then executed. The output of the command is directed to an output frame. Since the helps 2 and the lists 4 are contextual, a user can get help on the whole menu, any individual item in the menu, the whole dialogue, or any individual item in the dialogue.

Each interface menu object, called a system management tool menu option, is represented in a menu. A menu is not static, but rather it is a collection of menu options that were found in an object database at any one time to have the same search key. This is important in extending the function of the application, or the shell, because this allows a user to put in a new item in the menu by merely adding a new object, a new menu option, with the same search key as the other items on the menu that the user wants it to be included within. The next time that the user ran the shell, there would be an extra item (being the one just added) that would appear in the menu. Therefore, a menu is not static. Instead, it comprises all of the objects that happened to have met the search criteria at any one time. Users can thereby extend this interface tool by selecting a location in the tree where they want to hook into the shell, and by meeting the search criteria at that location.

Figure 8A:
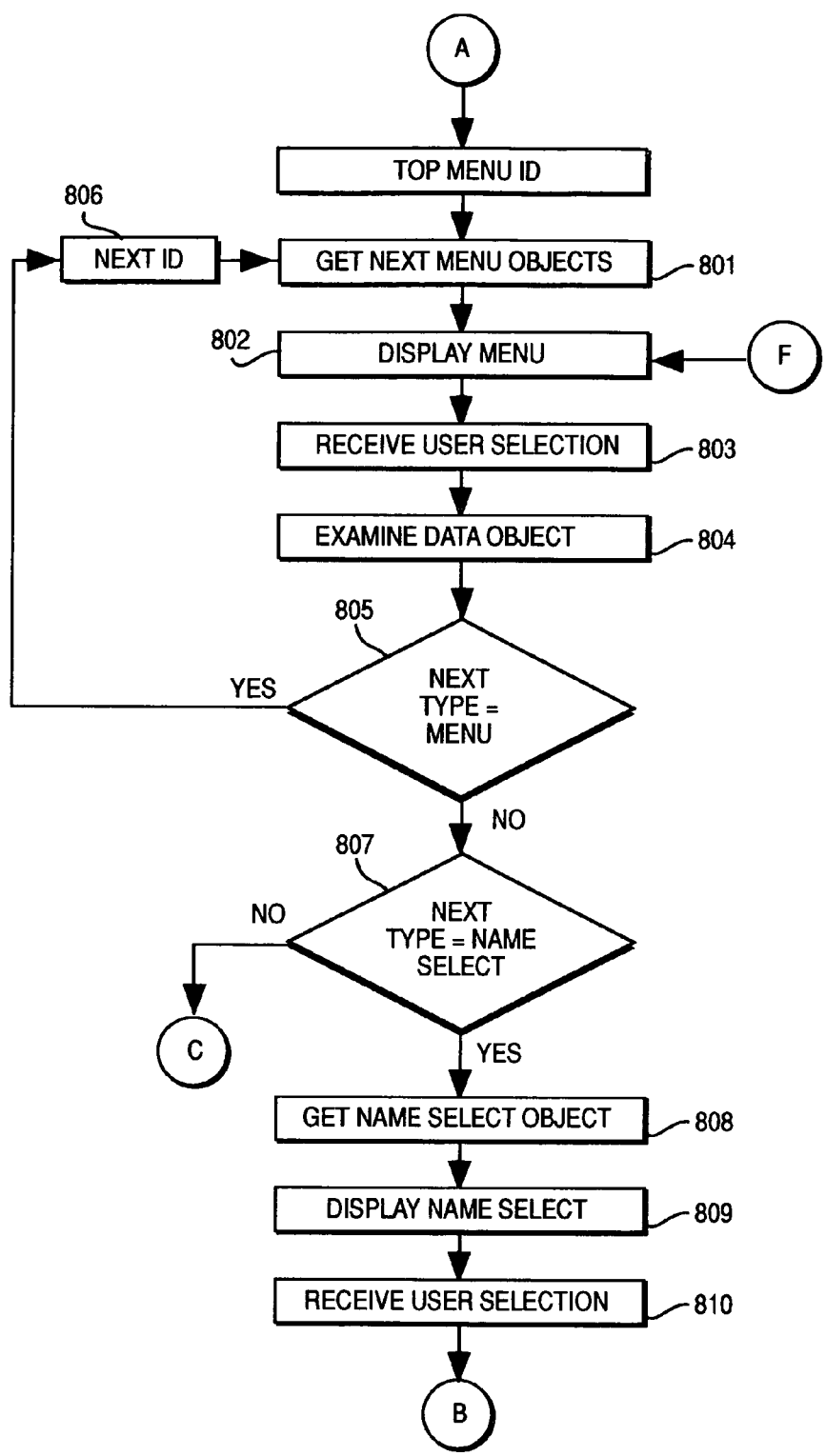
FIG. 8A-8C is a flow chart showing the traversal of the interface tool through the topology of the system.
Figure 8B:
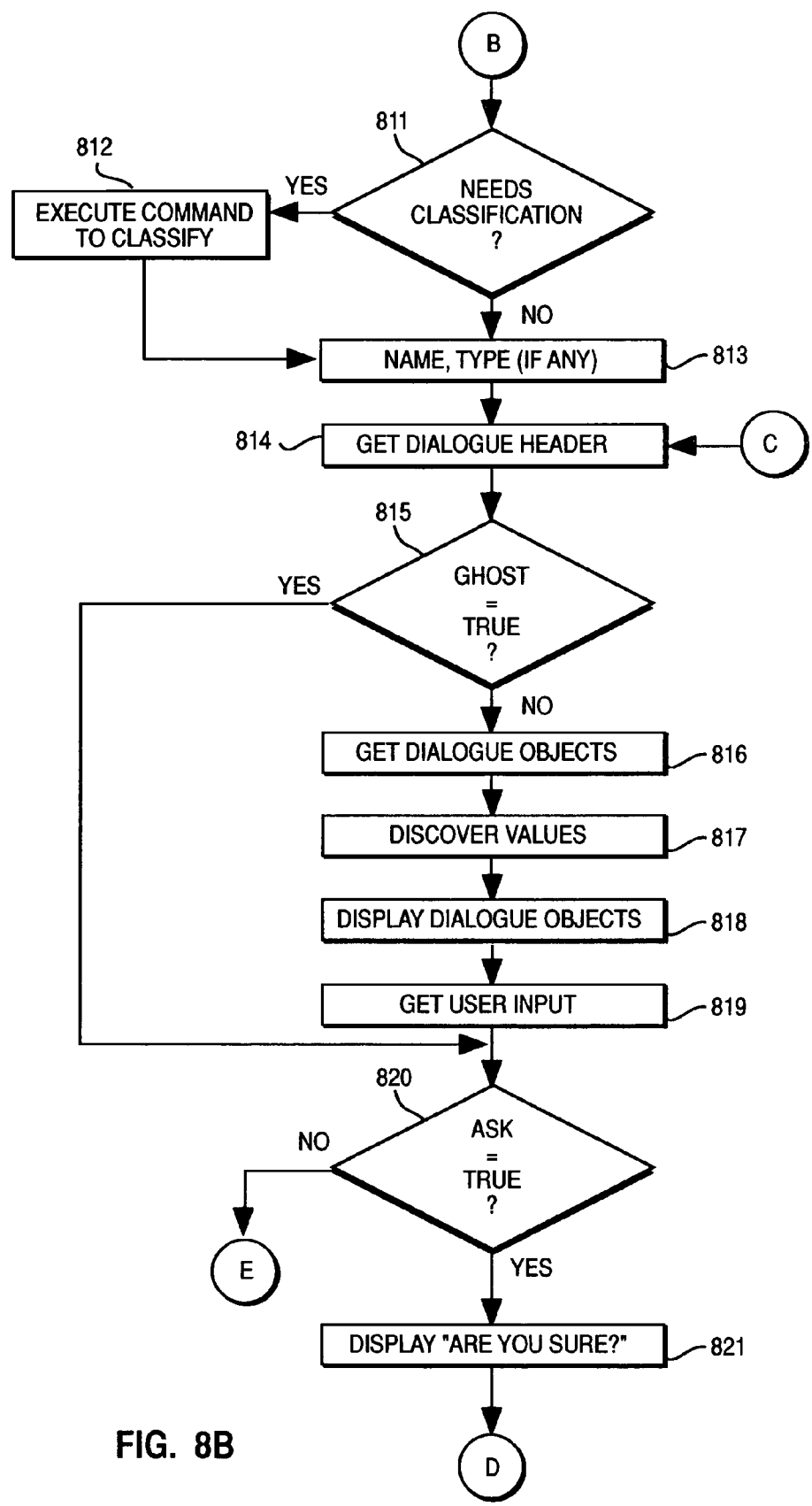
Figure 8C:
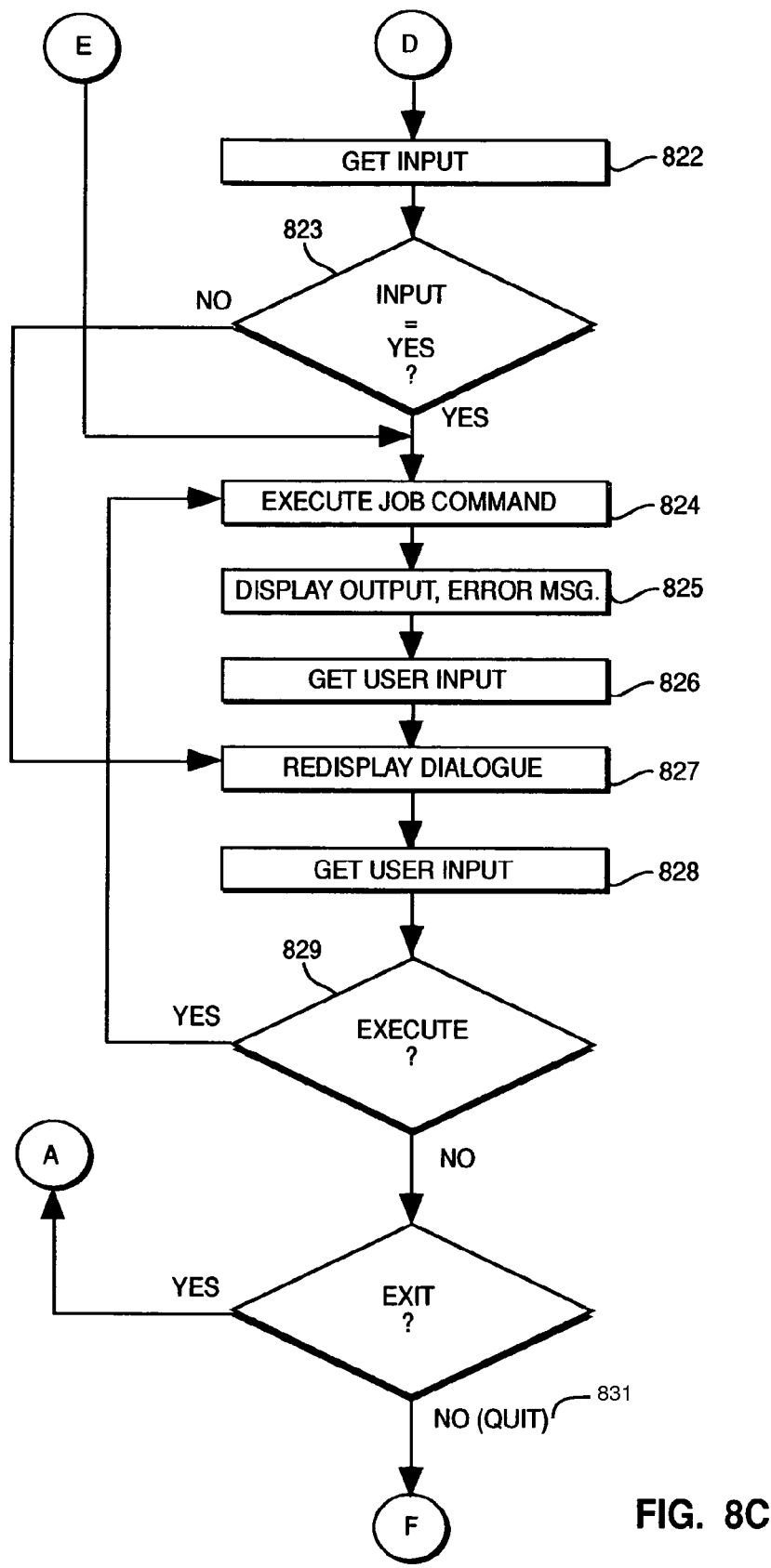

A general flow for traversing through the topology of the system is shown with reference to FIG. 8A-FIG. 8C. The id of the top menu is used as priming input to the menu processing module which uses the id to search for menu interface objects in the object data manager, step 801. The proper representation for the menu interface object is determined with reference to the linguistic and/or graphical environment. All objects found to meet the id key are sent for display to a screen library which enforces conformity by narrowing the interface to multiple graphical libraries, step 802. The collection of objects sent to the screen library from the interface tool is referred to herein as the logical frame presentation, since it has not yet been displayed to the user.

The screen library collects user input until a user selection is made, and sends the selection back to the menu processing unit, step 803. The menu processing module examines the menu interface object that represents the user selection, step 804. If the next type indicates a menu, step 805, then the next id is passed in recursive call, step 806, to the menu processing module. This loop continues until the next type is not a menu.

If the next type is found to be a name selector, step 807, then the name select processing module uses the id to search for a name selector interface object in the object data manager, step 808. The proper representation for the name selector interface object is determined with reference to the linguistic and/or graphical environment. The representation is sent for display to a screen library which enforces conformity by narrowing the interface to multiple graphical libraries, step 809. The screen library collects user input until a user selection is made, and sends the selection back to the name selector processing module, step 810. The name select processing module examines the name selector interface object to determine the interaction between the next id and the user selection in determining the search key for the dialogue header, step 811. There are three methods for performing this interaction. The first method indicates that the user selection is merely passed to the dialogue. In this case, the next_id field is a fully defined string. The command_to_classify is not needed and is therefore null. The user selection has no influence on the dialogue header object. The second method indicates that the name selected is concatenated with the string in next_id to produce the search key for the dialogue. In this case, the next_id is defined partially by the developer of the name select interface object and partially by the user based upon the user's selection. Again, the command_to classify is not needed and is therefore null. The third method indicates that the user selection is not sufficient for the determination of which dialogue next to present. In this case the name select processing module sends the user input as a parameter to the command_to_classify, and receives as output from the command a type, step 812. The user selected name and the type, if one exists, is passed to the dialogue processor module, step 813.

After step 813 and step 807 if the next_type is a dialogue interface object, control passes to the dialogue processing module. The dialogue processing module uses the id to search for a dialogue header interface object in the object data manager, step 814. The dialogue processing module examines the interface object to determine if the dialogue is a ghost, step 815. Ghost dialogues have no user I/O associated with them. If the dialogue is not a ghost, then the dialogue processing module uses the option id to search for the dialogue options in the object data manager, step 816. The command_to_discover is executed to get the proper default values for the dialogue option interface objects, step 817. The proper representation of each dialogue option interface object is determined with reference to the linguistic and/or graphical environment. The representations along with the discovered value are sent for display to a screen library which enforces conformity by narrowing the interface to multiple graphical libraries, step 818. The screen library collects user input until the user indicates that the job is to be executed, step 819. After step 819 and step 815 if the dialog is a ghost, the dialogue processing module examines the dialogue header object to determine if the user should be asked to reconsider the decision to execute the job, step 820. If yes, the user is asked, step 821, the response is received through the screen library, 822. If the user responds positively, step 823, or ask is false, step 820, then dialogue processing module will examine the command to execute in the dialogue header interface object, step 824. Any output or error messages that result from the execution of the command are displayed, step 825. A response is received from the user indicating that the user has finished reviewing any output or messages, step 826. The dialogue processing module redisplays the dialogue, step 827, and collects user input, step 828. If the user indicates that the command should be executed again, step 829, then the dialogue processing module returns to step 824. On the other-hand, if the user selects to exit, then control is passed to the menu processing module which redisplays the menu shown on entry to the interface tool, step 801. A third possibility is an indication to quit, step 831, which passes control to the processing module which displays the menu immediately preceding the dialogue.

As shown in FIG. 2, each object that is part of a menu has the structure as shown by sm_menu_option 200. If there are seven menu items, representing seven jobs, there would be seven of these sm_menu_option objects represented in the database with the same search key.

As a user passes through menus, the idea is to successively refine the job that is to be accomplished. Each subsequent menu is therefore an exploded view of the previous item. Through these subsequent menus, the job will be refined to a single job. The next_id 204 points to the next menu which is specified in next_type 209 until next_id 204 points to a dialogue specified by next_type 209. Similar to menus not being static, a dialogue is not static, either. The fields in the dialogue are objects, of type sm_command_option 300 as shown in FIG. 3, which meet the search criteria at that time. In addition, the owners of a command could present, in the interface shell, a newly implemented feature of that command by adding a new interface object into the database of type sm_command_option which met the same search criteria as the other fields in the dialogue.

The sm_command_option object 300 represents just one field in the dialogue. If a dialog had several fields, there would be several of the sm_command_option objects. Each sm_command_option object 300 has several items. The id 302 is the search criteria that is pointed to you by the previous interface object. The id sequence number 303 specifies that for all objects that meet the id search criteria, they are to be presented in a certain sequence on the screen. For example, if a dialogue corresponded to a command that had 5 options, there would probably be 5 fields in the dialogue which would then require 5 of the sm_command_option objects 300. Each object could then be numbered from 1-5. The name 305 is the field name which would actually appear on the screen. Since the preferred embodiment of this invention supports NLS (national language support) the name 305 is not actually used. Instead, there are three fields 306, 307, 308 which relate to the translation facility. These three fields specify a file or catalog 306 having names in a message set 307 which contain the actual message id. These three fields 306, 307, 308 are used to extract a language sensitive string or context sensitive icon. Only if these three fields are 0 or the message facility fails is the actual name field 305 used.

The type 309 is the method used to present the attribute represented by the interface object. Type 309 determines the type of field, i.e. whether the field is to be managed as a numeric field, as a text entry field, or as a ring field where the options are finite, etc. In a ring field, the user is not able to enter text, but merely hits a key repetitively to increment through the available options. Another type of field is referred to as a file field. The file field allows a user to select from known file names which tend to be error prone if entered. The required item 310 specifies whether the field needs to be sent at every command execution. This is necessary because only fields that the user has changed are sent. This prevents having to reestablish the defaults. However, since some fields must always be sent, whether changed by a user or not, the required item 310 is needed. The prefix field 311 is generally the flag that goes with this option. Although it is not displayed to the user, the prefix field is what is actually used to build the command.

The command to list 312, which is a regular operating command, is used to list the possible candidates for this one field. A user can position the cursor over the field and ask for LIST on that field and get all of the possible values. Command to list 312 is a command which produces standard out. For example, if a user wanted to print output to a printer but could not remember the name of the printers available, the user would select LIST. The interface tool would execute the command to list associated with the sm_command_option 300 that solicits the name of the target printer. Although this command to list is the same command that could be entered on a command line, instead of having the standard out of the executed command be directed to the screen, it is collected by this interface tool and put into the list panel 4. The command itself is not sensitive to this distinction. The user would then be presented with a list of all the supported configured printers from which to select. The user may select from this list to provide the value needed. The command to list 312 may not always be present since there are some items, such as a sequential list of numbers, which do not warrant the execution of a command to list.

The value items 314-318 indicates either the current value or the default value. For example, if the user task involved changing the configuration value of a printer, the user would need to know the current value and/or the default value. Again, fields 316-318, which relate to the message facility, are used since these values are also NLS sensitive as is the field name 305 as described above. For example if the value 315 had a value of "yes" or "no", the correct language for these values would be displayed to the user. The value index 314 indicates to the I/O routines which value in a ring is to be presented first. If the value index is zero, then the 0th element is presented first.

Since the values that are sent to operating system commands are somewhat cryptic, the aix_value 319 is used. The aix_value 319 has the same format as the display value 315 in form, but not in content. For example, if the display values in the natural language support were "edge" and "center", the operating system command does not actually use those values. The values "edge" and "center" are the values displayed to the user, if the environment indicates English, but the values used by the operating system command may be just "e" and "c". If the user selects the second value, then the interface builds the operating system command with the second aix_value. Help message id 320 is the contextual help for each individual item.

The following is a further description of building a command. The interface tool uses a 2-pass model for collection of values. The first pass gathers all the values of the data objects, in order, the prefix field 311 of which is either a null string or a flag, e.g. "-f". These are the parameters that are not position-sensitive and must immediately follow the command name. The second pass gather all of the values, in order, the prefix field 311 of which is the reserved string, "--". These are the parameters that are position-sensitive and follow the flagged options collected in the first pass.

A special mechanism exists for passing strings collected in the name selector that immediately precedes. The string may be either a "rawname", i.e., one selected by the user, or a "cookedname", i.e., the output of the cmd_to_classify 614. This (raw/cooked) name is a value which must have a data object defined for it. It will usually be the first object in the dialogue. The appearance on the screen of the instance selected ((raw/cooked)name) both facilitates the building of the command and increases the usability of the dialogue. The (raw/cooked) name either may or may not be preceded by a flag.

If the (raw/cooked) name has a flag, the data object sm_cmd_option allocated for it will be initialized with the proper flag in the prefix field. Because the disp_values field will not be initialized from any cmd_to_discover that might be run for the dialogue as a whole, the dis_field_name can be used to indicate that the value should be taken from the (raw/cooked) name instead. This is done by initializing the latter field with the reserved value, "rawname" or "cookedname". Initializing the required field to "yes" will cause the name to be sent, along with its flag, to the command, even though it is not changed in the dialogue. It should almost always be made a no entry field. Such values are not position-sensitive and will get picked up in the first pass as described above.

If the (raw/cooked) name does not have a flag, the data object sm_cmd_option allocated for it will be initialized with "———" in the prefix field. Because the disp_values field will not be initialized from any cmd_to_discover that might be run for the dialogue as a whole, the disc_field_name can be used to indicate that the value should be taken from the (raw/cooked) name instead. This is done by initializing the latter field with the reserved value, "_rawname" or "_cookedname". Initializing the required field to "yes" will cause this name to be sent to the command, even though it is not changed in the dialogue. It should almost always be made a no entry field. These values will get picked up in the second pass as described above. Since they are position sensitive vis-a-vis one another, they should appear in the dialogue in the necessary sequence.

The value index 314 is filled in from the header object class 400 (FIG. 4). The header object 400 has a command to discover field 412 which executes an operating system command. The output from this command is captured by the interface tool and is used to fill in the values for all of the display values fields 315 in the array of sm_command_option objects 300 that make up the dialogue. For example, if there is a command header 400 for "change printer characteristics", the command_to_discover is executed to discover the current characteristics of the printer. The output from the command_to_discover is then parsed by the interface tool to associate values with each individual interface object. For example, if the baud rate is represented in the output under the header, BR, then the value in that column is associated with the interface object whose discover_field_name 304 is the string BR. Therefore, the interface shell is dynamically constructed based on the current state of the data processing system. The output from the commands that query the current state are presented to the user. The user can use the current state values displayed or select/enter other values. The command is built based upon a combination of current data and user specified data.

Referring to FIG. 4, the dialogue header object class 400 points to the interface objects that make up the dialogue. The id 402 is the search id. Also in the header is another key field, the command_to_exec 408. The command_to_exec is the command that the dialogue executes. The command_to_exec is also the command that is logged. Commands that are used merely to list candidates or discover the current state, lateral or facilitating commands, are not logged, since these commands are peripheral to the task to be executed. Lateral commands read system data. End job commands may also write system data. The end job is the command_to_execute 408 in the dialogue header 400. In this way, the log contains only the commands that are actually used to configure the users machine, rather than commands that were merely used to collect information to help the user configure the machined. By logging the command_to_execute commands, the user can re-execute the log, and get exactly the same configuration subsequently.

The ghost feature 411 in the header object 400 indicates that there is to be no I/O to the screen. In some instances, a dialogue with the user is not needed, but since the interface tool of this invention is data driven, the dialogue object exists.

Figure 5A:
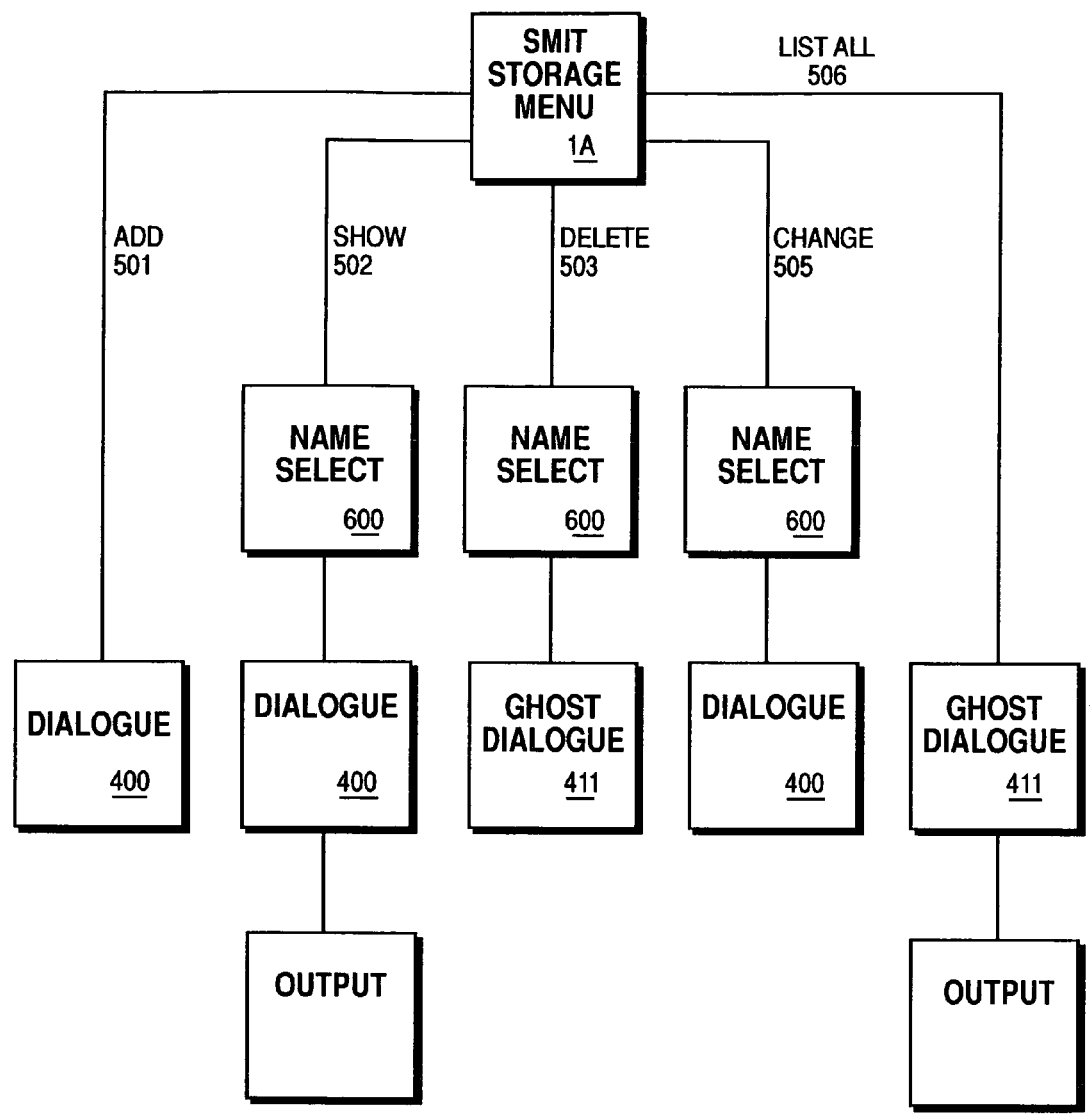
FIG. 5A shows the use of the interface objects in performing a system management job for a system resource.

The above description is illustrated in the block diagram of the interface tool as shown in FIG. 5A. For example, if a user wanted to perform system management tasks on the logical volume manager in the data processing system, the model used to accomplish this is shown by FIG. 5A. The menu 1A contains all logical volume jobs from which the user can select. Some of these more general tasks include ADD 501, SHOW 502, DELETE 503, CHANGE 505, and LIST ALL 506. In the ADD 501 model, the user goes straight into the dialogue 400 after selecting ADD off of the logical volume manager menu 1A. It would have a command_to_discover which would discover the defaults. Since the user has selected ADD 501, the user is not working with an existing system resource; hence no current information exists. This distinction between discovery of defaults and discovery of current settings is of no functional importance to the interface shell. The user then fills in the information into the dialogue and executes the ADD command_to_exec.

In using the SHOW 502 task, the user wants to see the characteristics of a system resource. Therefore, the interface has to be cognizant of which instance of this class of system resources to show. Therefore, the sm_name_select object 600 is required. For this example, the field would display to the user "name of logical volume". If the user knew the name the user wanted, the user would enter the name into the field. Since the name select object 600 also has a list feature, the interface uses an operating system command to list the names of logical volumes in a panel for the user to select from.

For other implementations of the SHOW command, a dialogue is not necessarily needed. However, as this example demonstrates, there could be different views of a system resource that a user might want to see. These different views are expressed in different execution parameters in SHOW 502. The dialogue for these different execution parameters allows users to select whether a limited amount of the data is to be shown, whether all of the data is to be shown, and to specify how the listing is to be shown, etc. The user interacts with the dialogue to make these determinations, executes the command, and receives output to the screen showing the data.

A sm_name_select object 600 is also used for the DELETE 503 task since the user has to indicate to the interface shell the name of the system resource to be deleted. However, the dialogue header object 400 is actually a ghost. A ghost dialogue means that, there is no I/O to the screen. A dialogue is not presented to the user because no further information is needed. However, if the deletion of the system resource had varieties of function (e.g. delete from active use but save info in a retention file as opposed to delete completely), then a screen dialogue would follow for solicitation of the user's wishes. There are no dialogue objects 300 associated with a ghost. The header is sufficient to execute the end command.

In the dialogue header object 400 there is an "ask" 409 field. If the "ask" 409 field is turned on, i.e. set to true, then the dialogue would display to the user "are you sure?". This ask function is useful for such tasks as deletion because it allows the user to verify that the user does indeed which to delete the item. If the user selects "yes", the DELETE command_to_execute 503 is executed. If the user selects no, the command is not executed.

In the performance of a CHANGE task, unlike the ADD task, the system resource to be changed already exists. The sm_name_select object 600 is utilized to get the name of the object. The command_to_discover is executed, the current values of the attributes of the system resource are found, these current values and attributes are presented to the user in the dialogue, the user responses are collected, and the CHANGE command_to_execute 505 is executed.

The sm_name_select 600 is not required for the LIST ALL task 506 since all of the names of the instances of this type of system resource will be used. The dialogue is a ghost dialogue since the user does not need to give any further instructions with this command. Therefore, the LIST ALL command_to_execute is executed immediately and the user receives output to the screen. A ghost dialogue typically infers that there is no I/O to the screen for interaction with the user. However, the dialogue object 400 is still required since the command to execute 408 resides within this structure.

Figure 5B:
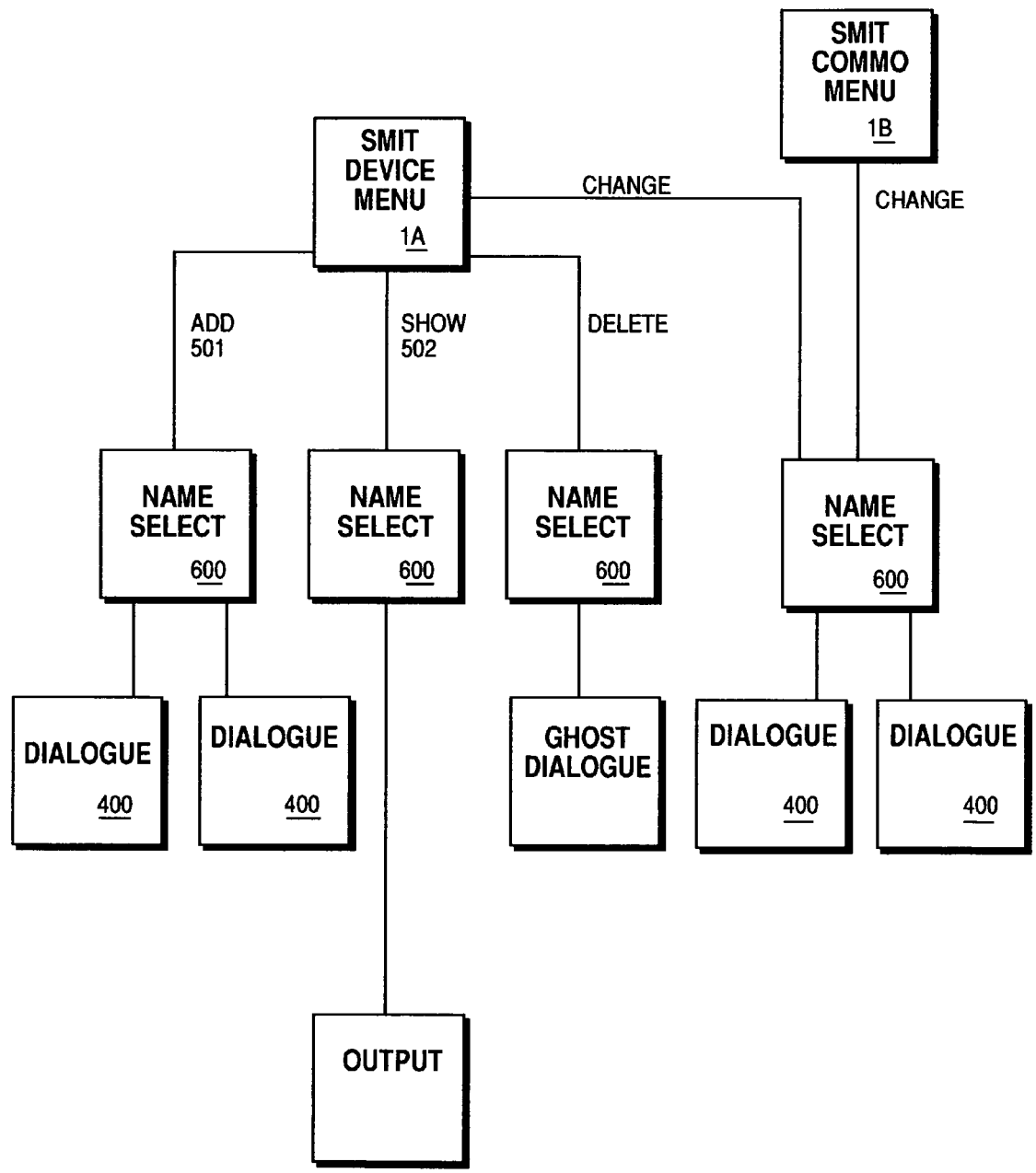
FIG. 5B shows the use of the interface objects in performing a system management job for another system resource.

A more complex example is shown in FIG. 5B with respect to the interface tool for managing printers or other physical devices in the system. To add a printer, a name select object 600 is required since, unlike logical volumes, all printers are not the same; they are diverse types. Therefore which dialogue object 400 is to be used is not known until the type is specified in the name select 600 facility. For example, to add a type A printer, one set of questions would be required in the dialogue, while if a type B printer were to be added another set of questions would be required in a dialogue. Therefore, to reach the correct dialogue object 400, the name_select_object 600 would ask the user the type of printer. There are different ways in which the name 604 in sm_name_select is used. The string indicated in the next_id 603 (FIG. 6) could be the actual search key for the dialogue header 400, in which case the name value is not important. However, the name may be needed to find the next dialogue header 400. For example, if a user did not know what type of printer they wanted to deal with, the user could select LIST to get a list of all supported printers. In this case, the interface takes the "type" to find the appropriate dialogue object 400. However, to perform a CHANGE 505 job, instead of changing a supported printer type, the user wants to change characteristics of an instance of a type of system resource, e.g. printer. The name of the instance might have been specified by the user and would then be very specific to the user's machine. It would not necessarily denote a type. If the user could not remember the machine specific name, the user would want to list the possible names. However, the list returned would not have the type names, but would have user specific names which the interface shell cannot understand in order to find the correct dialogue header object. Since these user specific names are not universal, an interface tool can not provide any predefined dialogue objects 400 for each of these user specific names. Instead, within the sm_name_select object there is a command_to_classify 614 which correlates a user specific name to a printer type. The command_to_classify then executes and concatenates the name with the search field to find the correct corresponding dialogue object 400.

For performing a SHOW task 502 for printers, the sm_name_select 600 is used to specify the name of the printer instance about which the user desires information. Since there is no further information that needs to be gathered, the SHOW command is executed directly, using the name selected, and the output is shown on the screen.

Comparing FIG. 5B with FIG. 5A, a dialogue was used after the name select object 601 as shown in FIG. 5A. There is nothing about the object itself which dictates whether a dialogue will follow a name select or not. Instead, it is dependent upon the commands, and how the commands are implemented. For instance, in some cases, the devices that are to be shown may be quite complex and have a large number of different attributes. In those cases, adding a dialogue to the SHOW command allows a user to select which attributes are to be shown and in which way. For example, in a dialogue, a user may be able to specify a "quick search", "show all fields", or "show only specified fields", etc. in order to specify how the SHOW command is to be executed. For more simple devices without many attributes, showing all of the information on that device my involve merely showing the name and device type. In these simpler cases, a dialogue is not needed since all of the information will be shown after the user indicates the instance of the system resource by means of the name selector.

If a name select object 601 is to follow immediately after a menu object class 200, the next_type field 209 in the menu object class 200 will specify a name select object. If a dialogue 400 is to follow immediately after a menu, the next_type field 209 will specify a dialogue object. If another menu object is to immediately follow the menu, the next_type field 209 in the menu object will specify another menu object. The interface tool continues to get menus, and remains recursive through these same routines, until the "next_type" field specifies a name select 601 or a dialogue 400.

Referring back to FIG. 5B, a "communications" menu 1B is shown leading to name select 601 for the CHANGE job. This merely illustrates that all of these jobs and actions can also be represented in another menu. Another menu can point into any one of these objects if it's next ID field 603 (FIG. 6) has the same search criteria as the other menu 1A.

As shown in the detailed description, each job (including but not limited to SHOW, ADD, DELETE, CHANGE, LIST ALL) is totally data driven. The code that is running is not dependent upon the command that is to be executed, what field it is gathering information from, what path it is on, the previous steps performed, or the next steps to be performed. All of the instructions for traversal through the objects, the menus, name selects, and dialogues, and the execution of commands are all contained within the data, and not the code. When a first object is built that represents a menu, or a dialogue, or a name select, the next object within the traverse of objects is specified within the first object itself, and so on recursively throughout the objects comprising the interface tool of this invention.

The interface tool of this invention can be used with all types of menus and dialogues to allow the menus, dialogues, tasks, and the execution of functions, including commands, to be data driven instead of predefined within code.

The preferred embodiment utilizes this interface tool as an interface to system management functions within a data processing system. One function of a system management facility is to provide configuration tasks for system resources. For example, if a new device, such as a hard disk drive, printer, display, etc. were to be added to a system, the new device might need to be configured at some time. Previously the manufacturer of the system would have to have accounted for the possible reconfiguration of this device in the menus and code supplied with the configuration facility of the system. With the interface tool of this system, a manufacturer of devices does not have to have the prior support from the manufacturer of the system. In order to manage new devices on a system no code has to be changed, and no code has to be recompiled. To add a device to the system, new interface objects are installed with the device driver code for the device. The new device interface objects only need to appear in one menu in order to give the user the ability to manage the device. The branch that presents the management job of the new device appears on a menu by virtue of a menu interface object having the same search key as the other menu interface objects that form that menu. The new object device would be added to the data repository such that the next time the configuration facility was run by a user, it would appear as if this new device was originally a part of the system management interface tool. This new device would then participate equally with all of the other devices in the system management interface.

Figure 1B:
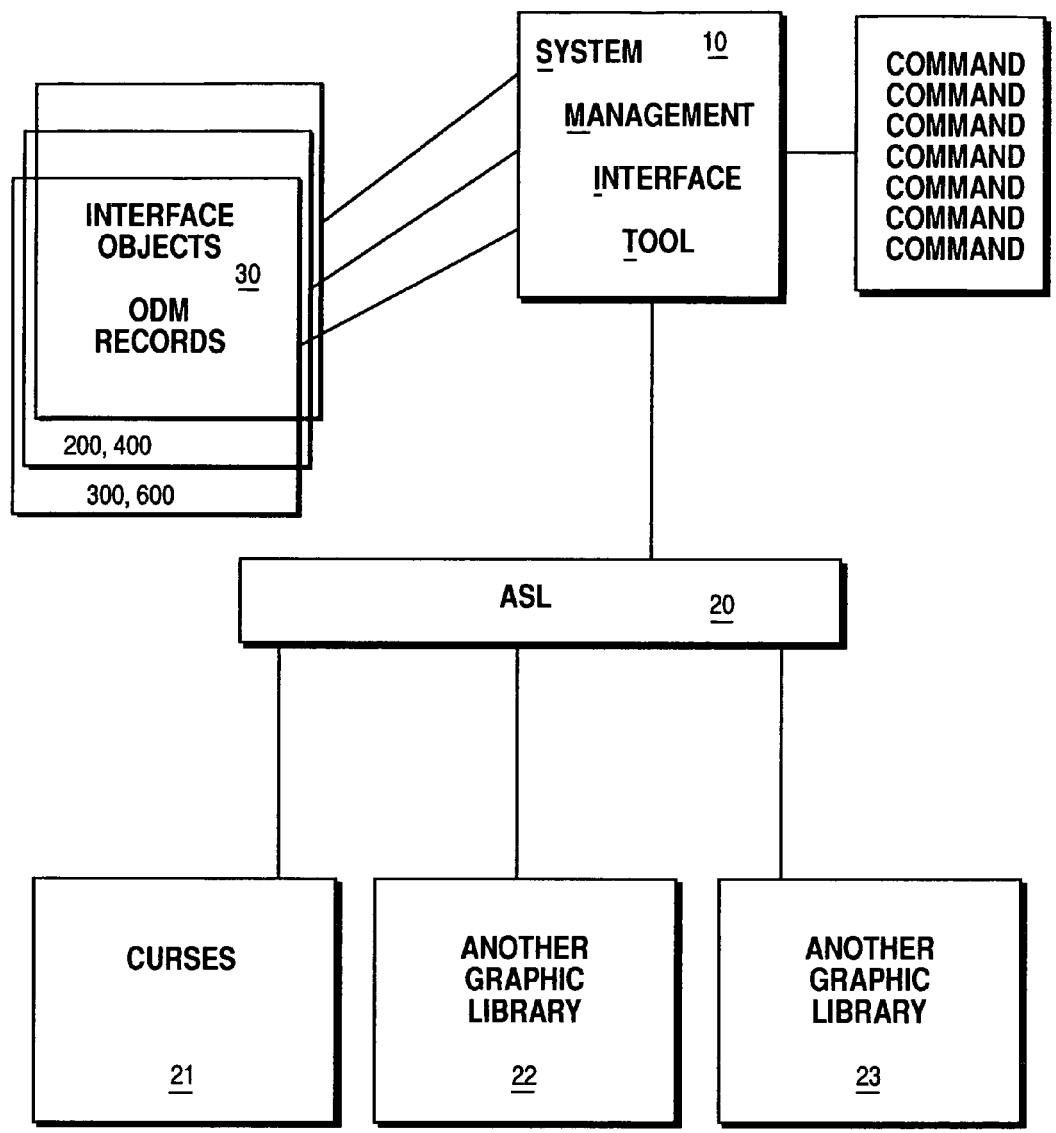
FIG. 1B is a block diagram of the interface tool of this invention retrieving interface objects from an object database for dynamically creating logical frame presentations for display to a user by a plurality of graphic libraries.

With reference to FIG. 1B, all of the objects, the menu objects 200, the dialogue objects 300, the dialogue header objects 400, and the name objects 600, are contained within the objected oriented database labeled as the object data manager records 30. The system management interface tool 10 begins by getting the top menu object from the object data manager 10. All objects that have the same id 202 (FIG. 2) are retrieved from the object data manager database 30 and presented by the interface tool 10. From this point on, the traversal through the objects (menus, names, dialogue), and the presentation of information from the objects, is determined by the data within the records, i.e. the objects themselves.

This is illustrated with reference to FIG. 7 and objects 701-706. A top menu 701 is shown where one of its fields contains the actual text 205 displayed as "DEVICES" 205. If command to execute, and wants to use the interface tool to facilitate the entry of parameters and options, then the interface tool can be invoked with the command name as a parameter, which is the id of the dialogue header interface object which executes that command. This second approach is referred to as the fast path method. All objects, by virtue of having an id, can be reached by this fast path method by the user passing the id as a parameter in the invocation of the interface tool. The interface tool then searches for an object with the id of the parameter sent. The interface tool first searches for a dialog header object with the given id. If found, the corresponding dialogue interface objects are sent to the screen library and presented to the user as in step 814, FIG. 8, and processing continues as described above. If the dialogue header is not found, the interface tool searches for a name selector object with the given id. If a dialogue is preceded by a name selector, then the command name is the id of the name selector rather the dialog header. If a name selector object is found, processing continues with step 808 as described above. Finally, the interface tool searches for a menu with the given id, and if found, processing continues with step 801 as described 20 above. Since some commands are represented by more than one dialogue, passing the command name as a parameter can not be taken as an unambiguous reference to a single dialogue. Therefore, a command name is the id of the lowest object in the hierarchy which represents all significant instances of the command. In most cases, this is a dialogue header, but could be a menu.

Figure 9A:
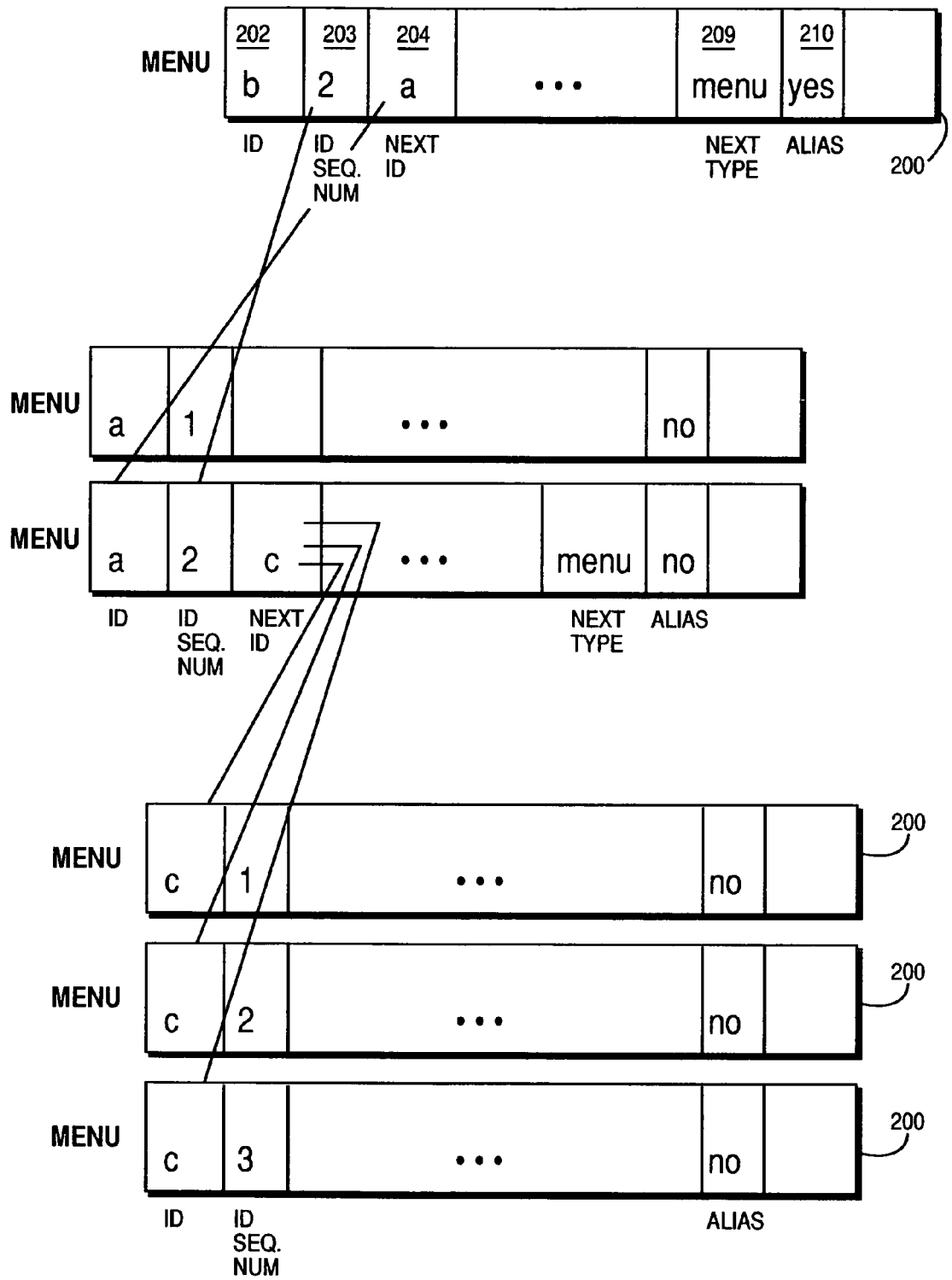
FIG. 9A illustrates an alias menu object pointing to another menu for creating a fast path into the hierarchy.
Figure 9B:
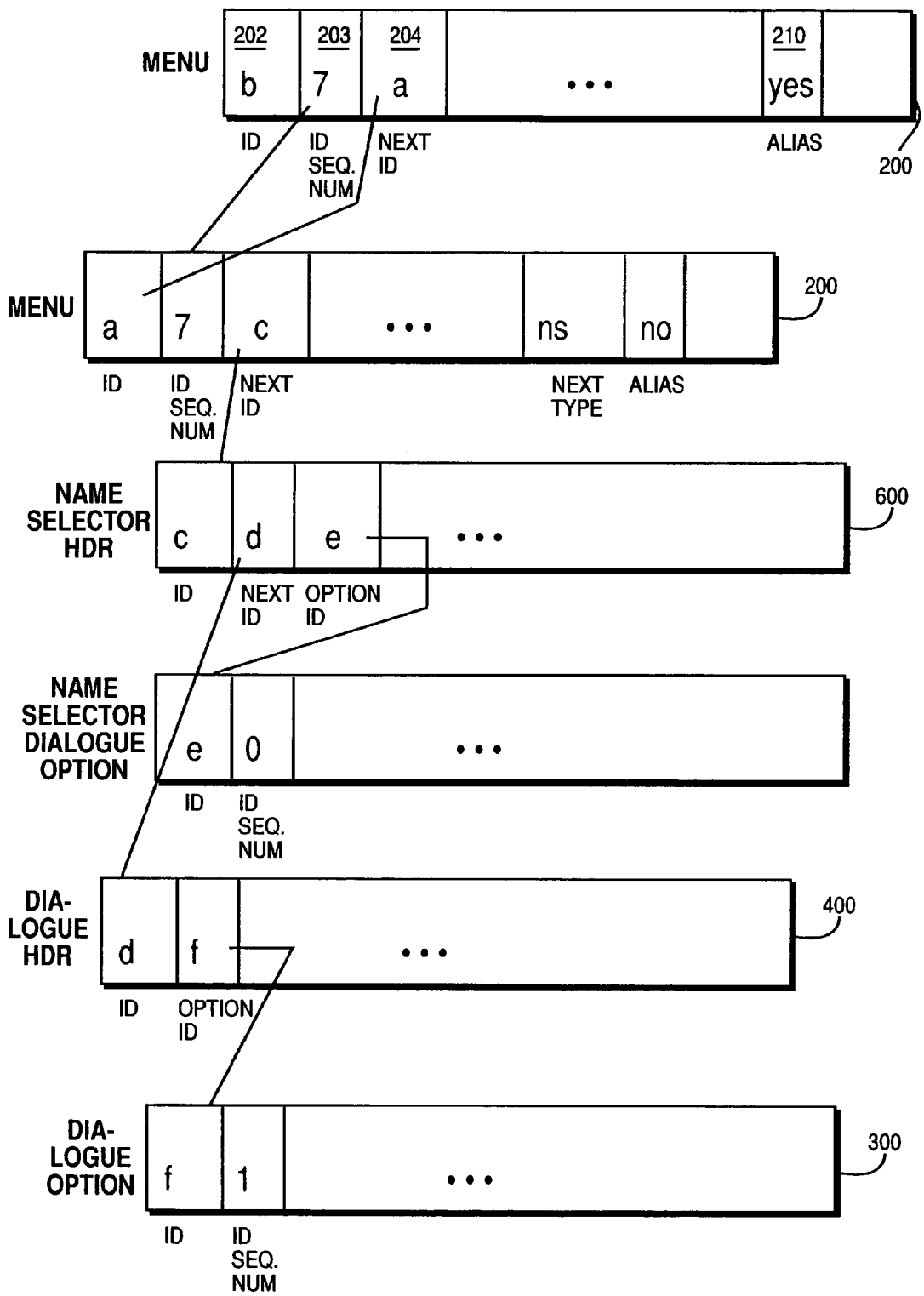
FIG. 9B illustrates an alias menu object pointing to a name selector for creating a fast path into the hierarchy.
Figure 9C:
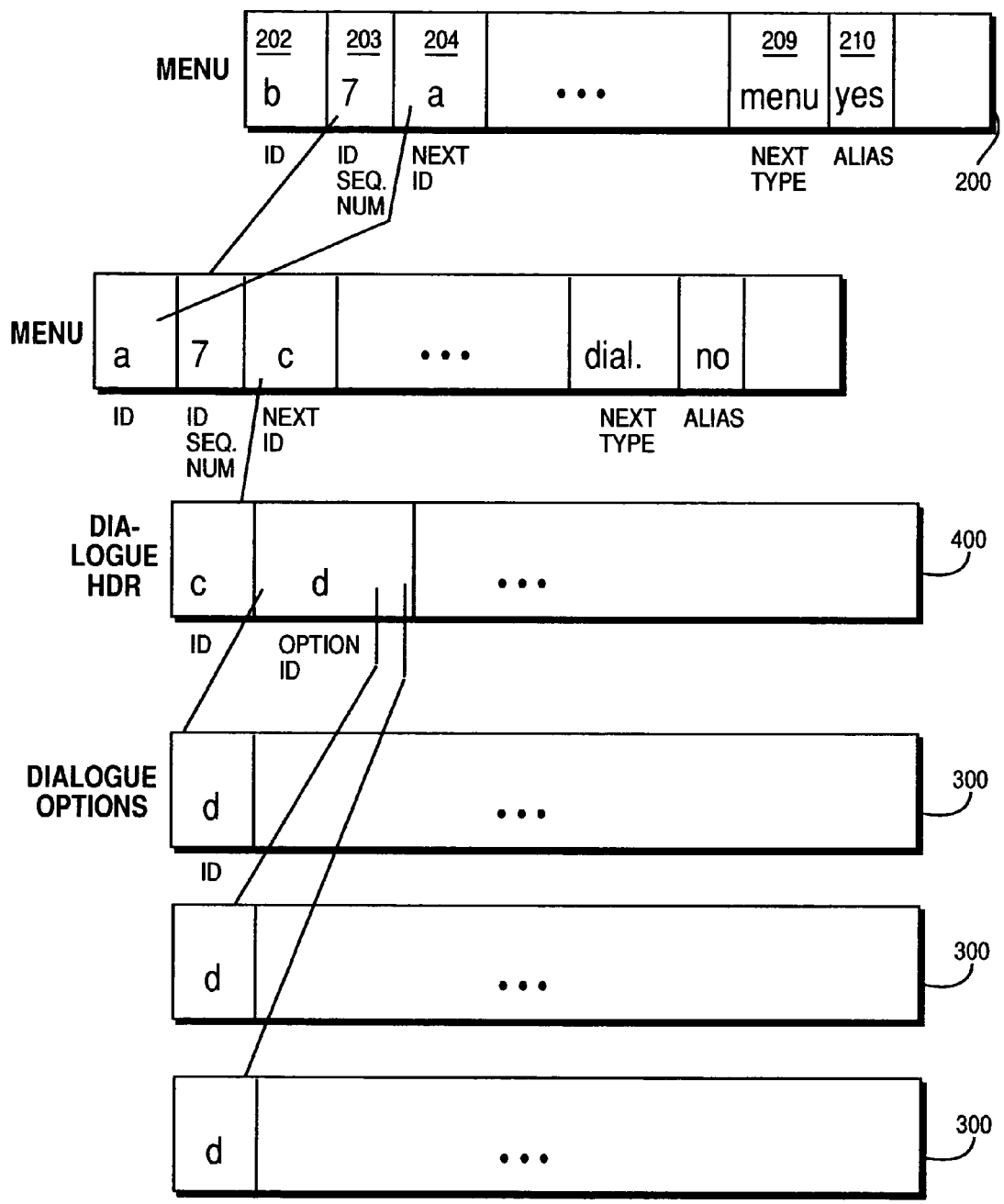
FIG. 9C illustrates an alias menu object pointing to a dialogue for creating a fast path into the hierarchy.

Another aspect of this fast path method is referred to as aliasing, as shown in FIGS. 9A, 9B, and 9C. A situation may arise where more than one fast path token should point to the same node in the hierarchy. One token is the actual id of an object through which one would pass if the hierarchy were traversed from the top down. Other tokens, while not in the hierarchy, point to this token which is in the hierarchy. An alias is always a menu interface object 200, the alias field 210 of which has the value of true. The interface tool finds the menu object to which the alias points, and processes it as if it had been selected. This allows the processing to begin at step 804, FIG. 8. In this way, alias can be used to point into the hierarchy at either a menu, FIG. 9A, a name selector, FIG. 9B, or a dialogue, FIG. 9C, while actually existing outside of the hierarchy.

The above describes a fast path into the interface tool hierarchy. A facility also exists for escaping out of the tool into the command shell from which other applications or commands can be executed before returning to the point in the interface from which the user escaped.

As shown in FIG. 1B the ASL layer 20 is used to present the information to the user and collect user responses. The ASL layer is a screen library layer which protects the interface shell from dealing with differences in text or graphic libraries 21, 22, 23. Several presentation libraries 22, 23 can be interchanged to produce different presentation styles. The target graphic library may be chosen by the user at initialization time or may be based on an external environment variable. These other support libraries may include presenting graphics and text to the user. Regardless of the presentation interface 20 used, the same objects within the object data manager, database 30 are used. The data objects within the database are defined only once. Each graphics library can then use its own symbols to present the information from the objects to the user. These interchangeable graphic interfaces merely present the same information from the interface tool in different visual ways.

Although the interface tool is protected from difference in graphics libraries by the ASL layer, the ASL layer enforces certain continuity and provides common function regardless of the graphics library bound to ASL. One such function is used when the logical frame presentation exceeds the size of the physical display area. The ASL layer shows the user the number of elements (data objects) which have been scrolled off of the screen in any direction.

The various logical frame presentations that may be accessible by several system administrators having various system authority can be controlled by applying access control policies to the interface objects. The method of applying access control policies to objects is further described in application Ser. No. 07/352,081 filed May 15, 1989 in the name of R. A. Fabbio, now abandoned, hereby incorporated by reference. These access control policies can be applied to each interface object. A menu interface tool is operating in behalf of a user whose credentials do not meet those that are in the access control list attached to the interface object. Each of the various interface objects are stored at only one location in the object database, and are assigned the appropriate access controls such that the various permutations of administrative views are dictated by the access control policy for the objects within the view. For example, administrator A may have read, write, and execute privileges for the user interface objects which present the configurable domain of TCP/IP, devices, and users, while administrator B may have read, write, and execute privileges for the user interface objects which present the configurable domains of TCP/IP, SNA, devices, users, and systems. Therefore, it is possible to tailor the menus, dialogs, and options, that each administrator interacts with by setting the appropriate access control policies on the various objects which define the user interface.

Another security method is inherent within the interface tool, since security is built into each of the commands that the interface executes. Since the interface tool uses the commands to alter the system resource objects rather than altering these objects itself, any security filters in the command will be automatically applicable when the interface tool executes the command. If the user of the interface tool does not have permission to execute the command, the command itself will prevent the execution of the command, and the interface tool will return an error message to user that the command could not be executed.

Although the preferred embodiment refers to configuration tasks and commands, the specific commands are not a part of the interface tool. Each command is merely a string in the command to execute field within the dialogue header interface object. To the interface tool, one command is the same as any other command. No special code is contained within the interface tool to execute the various commands.

Therefore, this engine model for an interface tool is applicable not only to system management functions, but for any function which requires a function to be executed. Other functions, commands, and tasks may include those needed to read the mail, sending a note, etc. Any end user task can be executed with this interface tool by merely adding to the interface objects in the object data manager database.

While the invention has been particularly shown and described with reference to a preferred embodiment, it will be understood by those skilled in the art that various changes in form and detail may be made without departing from the spirit and scope of the invention.

The invention claimed is:

1. An interface having means for presenting items for selection by a user of a data processing system, and having means for executing the items which are selected, said interface comprising:
means for representing a plurality of interface objects in an object database; and
means for dynamically associating different ones of said interface objects with a plurality of logical frame presentations based upon data within each of said different ones of said interface objects, wherein at least one of said plurality of interface objects represent at least one attribute of at least one system resource.

2. The interface of claim 1 further comprising means for utilizing a current value of said at least one attribute of said at least one system resource for presentation to said user.

3. The interface of claim 1 further comprising means for utilizing at least one instance of at least one of said system resources for presentation to said user for informing said user of an availability of said instance of said system resource.

4. The interface of claim 3 further comprising means for allowing the user to select said instance of said system resource presented to said user.

5. The interface of claim 1 further comprising means for utilizing a current value of said at least one attribute of said at least one system resource for a validation of a user response.

6. An interface having means for presenting items for selection by a user of a data processing system, and having means for executing the items which are selected, said interface comprising:
means for representing a plurality of interface objects in an object database; and
means for dynamically associating different ones of said interface objects with a plurality of logical frame presentations based upon data within each of said different ones of said interface objects, wherein at least two of the plurality of interface objects represent a hierarchical relationship between components of the data processing system based upon the data within each of said at least two interface objects.

7. The interface of claim 6 wherein the interface objects are dynamically associated according to said hierarchical relationship represented within each of said at least two interface objects.

8. The interface of claim 6 further comprising means for directly entering said hierarchical relationship by entering interface objects at least one of a plurality of locations within said hierarchy.

9. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and means for managing of a screen presentation of the interface objects and a user interaction with said interface objects based upon the data within at least one of the plurality of interface objects.

10. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means for dynamically constructing a command by associating at least one user input value with an option within said at least one of said interface objects.

11. The interface of claim 10 further comprising means for executing said command.

12. The interface of claim 11 further comprising means for logging said command for later reexecution.

13. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means for constructing and executing a command based on a current state of said data processing system, a plurality of user selections, and data within said interface objects.

14. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means for retrieving said interface objects from said object database in response to said user selected item.

15. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means for iteratively presenting said interface objects to said user dependent upon a plurality of user selections and data within said interface objects.

16. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means for accessing at least one interface object from a plurality of screen presentations.

17. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means for accessing at least one screen presentation from a plurality of interface objects.

18. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means for altering the object database from within the interface during a session of execution of said interface, and means for reflecting an altered interface during a same session of execution of said interface.

19. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means for altering said object database by creating at least one new interface object.

20. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means for displaying said logical frame presentations by a plurality of graphical libraries.

21. An interface having means for presenting items for selection by a user of a data processing system, and having means for executing the items which are selected, said interface comprising:
means for representing a plurality of interface objects in an object database;
means for dynamically associating different ones of said interface objects with a plurality of logical frame presentations based upon data within each of said different ones of said interface objects; and
means, within said interface objects, for representing said items in said logical frame presentation in at least one of a plurality of ways dependent upon a graphical context.

22. An interface having means for presenting items for selection by a user of a data processing system, and having means for executing the items which are selected, said interface comprising:
   means for representing a plurality of interface objects in an object database;
   means for dynamically associating different ones of said interface objects with a plurality of logical frame presentations based upon data within each of said different ones of said interface objects; and
   means, within said interface objects, for representing said items in said logical frame presentation in at least one of a plurality of ways dependent upon a linguistic context.

23. An interface having means for presenting items for selection by a user of a data processing system, and having means for executing the items which are selected, said interface comprising:
   means for representing a plurality of interface objects in an object database;
   means for dynamically associating different ones of said interface objects with a plurality of logical frame presentations based upon data within each of said different ones of said interface objects; and
   means for accessing a screen library having means for indicating to said user a number of said items in said logical frame presentation currently outside of a visual screen presentation to said user.

24. An interface having means for presenting items for selection by a user of a data processing system, and having means for executing the items which are selected, said interface comprising:
   means for representing a plurality of interface objects in an object database;
   means for dynamically associating different ones of said interface objects with a plurality of logical frame presentations based upon data within each of said different ones of said interface objects; and
   means for providing at least one logical frame presentation dependent upon at least one access control policy applied to said plurality of interface objects.

25. A method for presenting items for selection by a user of a data processing system, said method comprising:
   representing a plurality of interface objects in an object database;
   dynamically associating different ones of said interface objects with a logical frame presentation having a hierarchical relationship between at least two of said interface objects wherein the logical frame presentation has a lower level interface object associated with a higher level interface object based upon data within the lower level interface object;
   using an identifier associated with the higher level interface object to search for lower level interface objects having this identifier within the data; and
   sending all interface objects meeting the identifier as a search key to a screen library as the logical frame presentation for display.

26. A method for presenting items for selection by a user of a data processing system, said method comprising:
   representing a plurality of interface objects in an object database; and
   dynamically associating different ones of said interface objects with a logical frame presentation having a hierarchical relationship between at least two of said interface objects wherein the logical frame presentation has a lower level interface object associated with a higher level interface object based upon data within the lower level interface object, wherein the higher level interface object is a collection of lower level interface objects found in the object database at any one time to have a same search key.

27. A method for presenting items for selection by a user of a data processing system, said method comprising:
   representing a plurality of interface objects in an object database;
   dynamically associating different ones of said interface objects with a logical frame presentation having a hierarchical relationship between at least two of said interface objects wherein the logical frame presentation has a lower level interface object associated with a higher level interface object based upon data within the lower level interface object; and
   enabling a user to extend a user interface at a location within the hierarchy by adding to the object database additional lower level interface objects meeting a search key criteria at the location.

28. The method of claim 27 further comprising sending the additional lower level objects to the screen library as the logical frame presentation without re-compilation when a desired environment requiring the logical frame presentation is next entered by a user interface user.

* * * * *